(12) United States Patent
Kim

(10) Patent No.: US 12,541,937 B2
(45) Date of Patent: Feb. 3, 2026

(54) IMAGE ACQUISITION APPARATUS AND METHOD OF OPERATING THE SAME

(71) Applicant: SAMSUNG ELECTRONICS CO., LTD., Suwon-si (KR)

(72) Inventor: Woo-Shik Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 166 days.

(21) Appl. No.: 18/381,486

(22) Filed: Oct. 18, 2023

(65) Prior Publication Data

US 2024/0320944 A1   Sep. 26, 2024

(30) Foreign Application Priority Data

Mar. 24, 2023   (KR) .................. 10-2023-0039318

(51) Int. Cl.
| | |
|---|---|
| G06V 10/143 | (2022.01) |
| G06T 7/11 | (2017.01) |
| G06T 7/13 | (2017.01) |
| G06T 7/30 | (2017.01) |
| G06V 10/56 | (2022.01) |
| G06V 10/60 | (2022.01) |

(Continued)

(52) U.S. Cl.
CPC ............. *G06V 10/143* (2022.01); *G06T 7/11* (2017.01); *G06T 7/13* (2017.01); *G06T 7/30* (2017.01); *G06V 10/56* (2022.01); *G06V 10/60* (2022.01); *G06T 2207/10024* (2013.01); *G06T 2207/10036* (2013.01)

(58) Field of Classification Search
CPC ...... G06V 10/143; G06V 10/56; G06V 10/60; G06T 7/11; G06T 7/13; G06T 7/30; G06T 2207/10024; G06T 2207/10036; H04N 23/11; H04N 23/13; H04N 23/15; H04N 23/71; H04N 23/84; H04N 9/73; H04N 23/56; H04N 23/815; H04N 23/83; H04N 23/85; H04N 23/45; H04N 23/54; H04N 23/82; H04N 23/88; H04N 23/951; G06N 3/08

See application file for complete search history.

(56) References Cited

U.S. PATENT DOCUMENTS

| 9,723,285 B2 | 8/2017 | Yoshizaki |
|---|---|---|
| 11,323,676 B2 | 5/2022 | Romanenko et al. |

(Continued)

FOREIGN PATENT DOCUMENTS

| EP | 4 142 300 A1 | 3/2023 |
|---|---|---|
| EP | 4 250 723 A1 | 9/2023 |
| WO | 2022/126438 A1 | 6/2022 |

OTHER PUBLICATIONS

Communication issued Jun. 14, 2024 by the European Patent Office in EP Application No. 24150686.4.

*Primary Examiner* — Ahmed A Berhan
(74) *Attorney, Agent, or Firm* — Sughrue Mion, PLLC

(57) ABSTRACT

An image acquisition apparatus includes: a sensor unit including a plurality of first image sensors that are based on a wavelength band of 380 nm to 780 nm; and at least one processor. The at least one processor is configured to: acquire common illumination information from an image output from at least one of the plurality of first image sensors, and color-convert an image output from each of the plurality of first image sensors based on the common illumination information.

19 Claims, 27 Drawing Sheets

(51) Int. Cl.
  *H04N 9/73* (2023.01)
  *H04N 23/13* (2023.01)
  *H04N 23/56* (2023.01)
  *H04N 23/71* (2023.01)
  *H04N 23/80* (2023.01)
  *H04N 23/84* (2023.01)

(56) References Cited

U.S. PATENT DOCUMENTS

| | | | |
|---|---|---|---|
| 2008/0231726 A1* | 9/2008 | John | H04N 23/88 |
| | | | 358/516 |
| 2017/0230585 A1* | 8/2017 | Nash | H04N 23/69 |
| 2018/0025478 A1* | 1/2018 | Lee | H04N 23/90 |
| | | | 382/284 |
| 2023/0066267 A1 | 3/2023 | Kim et al. | |
| 2023/0078522 A1 | 3/2023 | Yu et al. | |
| 2023/0217088 A1 | 7/2023 | Kim et al. | |
| 2023/0325999 A1 | 10/2023 | Dong et al. | |

* cited by examiner

IMAGE ACQUISITION APPARATUS AND METHOD OF OPERATING THE SAME

CROSS-REFERENCE TO RELATED APPLICATION

This application is based on and claims priority under 35 U.S.C. § 119 to Korean Patent Application No. 10-2023-0039318, filed on Mar. 24, 2023, in the Korean Intellectual Property Office, the disclosure of which is incorporated by reference herein in its entirety.

BACKGROUND

1. Field

The present disclosure relates to image acquisition apparatuses and methods of operating the same.

2. Description of the Related Art

Image sensors receive light incident from an object and photoelectrically convert the received light into an electrical signal.

Such an image sensor uses a color filter including an array of filter elements capable of selectively transmitting red light, green light, and blue light for color expression, senses the amount of light that passed through each filter element, and then forms a color image of an object through image processing.

Because the values sensed by image sensors are affected by illumination, the colors of images captured by cameras are also affected by illumination. A technique for eliminating such effects and photographing the unique colors of objects as much as possible is referred to as "white balance" (WB).

When an object is photographed via one device including a plurality of image sensors, images output from the image sensors may have different white points from one another due to a difference in resolutions, focal lengths, field of view in the image sensors or a manufacturing tolerance. When the white points are different from one another, the images output respectively from the image sensors may represent different colors even they are output from one device.

SUMMARY

Provided are image acquisition apparatuses capable of maintaining color consistency by applying common illumination information to each of a plurality of image sensors included in one device, and operating methods therefor. However, the technical goal is not limited thereto, and other technical goals may be inferred from the following embodiments.

Additional aspects will be set forth in part in the description which follows and, in part, will be apparent from the description, or may be learned by practice of the presented embodiments.

An image acquisition apparatus may include: a sensor unit including a plurality of first image sensors that are based on a wavelength band of 380 nm to 780 nm; and at least one processor. The at least one processor may be configured to: acquire common illumination information from an image output from at least one of the plurality of first image sensors, and color-convert an image output from each of the plurality of first image sensors based on the common illumination information.

The at least one processor being configured to acquire the common illumination information may include being configured to: acquire individual illumination information with respect to each image output from the plurality of first image sensors, overlay the individual illumination information based on a positional relationship between pixels in the individual illumination information, and acquire the common illumination information from the overlaid individual illumination information.

In the plurality of first image sensors, at least one of focal length or field of view (FOV) may be different from each other.

The at least one processor being configured to overlay the individual illumination information may include being configured to over lay the individual illumination information in an order in which the focal length of the plurality of first image sensors increase or in an order in which the FOV of the plurality of first image sensors decrease.

The at least one processor being configured to acquire the common illumination information may include being configure to input the image output from each of the plurality of first image sensors into a deep-learning network that is trained in advance.

The processor being configured to acquire the common illumination information may include being configured to acquire the common illumination information from one of the images output from the plurality of first image sensors, the plurality of first image sensors having different focal lengths and fields of view (FOVs) from each other.

The sensor unit may be configured to, when a focal length of a reference image sensor from which the common illumination information is acquired is greater than a focal length of a target image sensor in which color conversion is to be performed, estimate the common illumination information with respect to the target image sensor through an extrapolation.

The sensor unit may be configured to, when an FOV of a reference image sensor from which the common illumination information is acquired is less than an FOV of a target image sensor in which color conversion is to be performed, estimate the common illumination information with respect to the target image sensor through an extrapolation.

The sensor unit may further include a second image sensor configured to divide a light spectrum into more wavelength bands than the first image sensors. The at least one processor may be further configured to acquire the common illumination information from an image output from the second image sensor.

The second image sensor may include a multispectral image sensor configured to acquire images of at least four channels based on a wavelength band of 10 nm to 1000 nm.

The at least one processor may be further configured to acquire the common illumination information based on at least one of the at least four channels acquired from the multispectral image sensor.

The common illumination information may include at least one of a color temperature of an illumination, an illumination vector corresponding to an intensity of an illumination spectrum, an XYZ vector indicating a color of illumination, an RGB vector indicating a color of illumination, or an index value indicating illumination information stored in advance, with respect to an image on which color conversion is to be performed.

The at least one processor may be further configured to: divide a reference image from which the common illumination information is acquired into a plurality of regions, and acquire illumination information for each of the plurality of regions from at least one of the plurality of regions.

The at least one processor being configured to acquire the common illumination information may include being configured to acquire the common illumination information by interpolating the illumination information for each of the plurality of regions obtained from the divided reference image.

The at least one processor being configured to acquire the common illumination information may include being configured to acquire the common illumination information based on a basis vector, a spatial position, and a channel index of a reference image from which the common illumination information is acquired.

The at least one processor may be further configured to register a first image output from a reference image sensor and a second image output from a target image sensor, based on at least one of positional information, a resolution, an optical axis, an FOV, or a focal length of each of the reference image sensor from which the common illumination information is acquired and the target image sensor on which color conversion is to be performed.

The at least one processor being configured to register the first image and the second image may include being configured to register the first image and the second image based on edges and features of the first image and the second image.

The at least one processor may be further configured to perform a white balance on the second image based on the common illumination information of the first image.

The at least one processor may be further configured to perform a gamma correction or a color correction on the color-converted image.

An image acquisition method may include: acquiring images from a plurality of first image sensors that are based on a wavelength band of 380 nm to 780 nm; acquiring common illumination information from an image output from at least one of the plurality of first image sensors; and color-converting the image output from each of the plurality of first image sensors based on the common illumination information.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
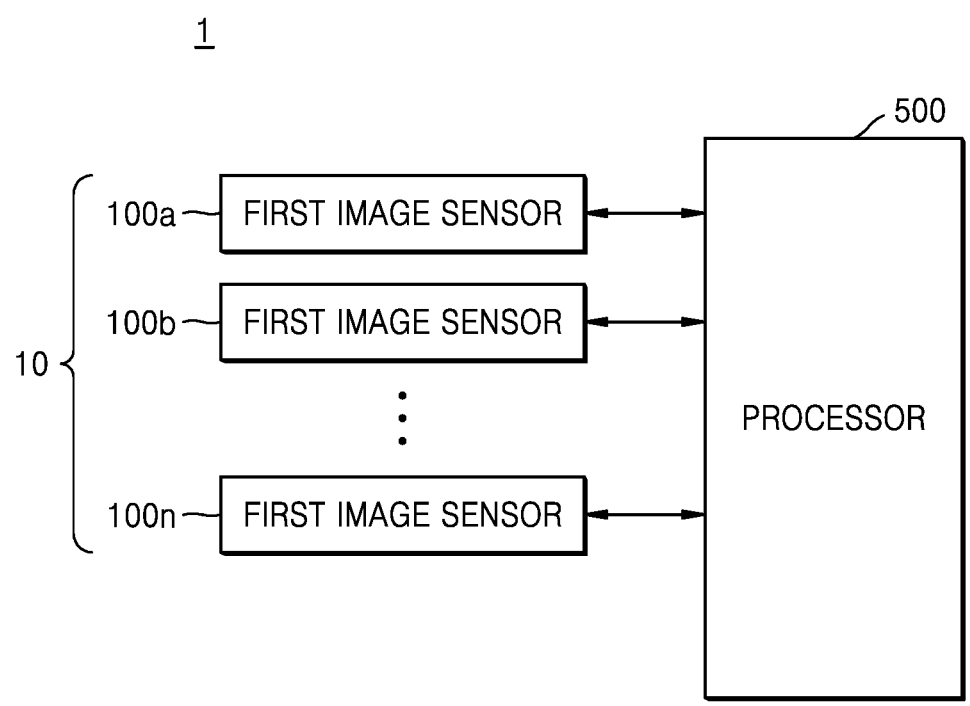
FIG. 1 is a schematic block diagram of an image acquisition apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The disclosed embodiments will be described in detail below with reference to accompanying drawings. The embodiments are capable of various modifications and may be embodied in many different forms. In the drawings, like reference numerals denote like components, and sizes of components in the drawings may be exaggerated for convenience of explanation.

Hereinafter, it will be understood that when a layer, region, or component is referred to as being "above" or "on" another layer, region, or component, it may be in contact with and directly on the other layer, region, or component, and intervening layers, regions, or components may be present.

It will be understood that although the terms "first," "second," etc. may be used herein to describe various components, these components should not be limited by these terms. These components are only used to distinguish one component from another. These terms do not limit that materials or structures of components are different from one another.

An expression used in the singular encompasses the expression of the plural, unless it has a clearly different meaning in the context. It will be further understood that when a portion is referred to as "comprising" another component, the portion may not exclude another component but may further comprise another component unless the context states otherwise.

In addition, the terms such as " . . . unit", "module", etc. provided herein indicates a unit performing at least one function or operation, and may be realized by hardware, software, or a combination of hardware and software.

The use of the term of "the above-described" and similar indicative terms may correspond to both the singular forms and the plural forms.

Also, the steps of all methods described herein may be performed in any suitable order unless otherwise indicated herein or otherwise clearly contradicted by context. Also, the use of all exemplary terms (for example, etc.) is only to describe a technical spirit in detail, and the scope of rights is not limited by these terms unless the context is limited by the claims.

In general, a value sensed by a camera may be expressed by the product of illumination, the color of an object, and the response of the camera according to Equation 1 below.

$$\rho = \int E(\lambda) S(\lambda) R(\lambda) d\lambda \qquad \text{[Equation 1]}$$

where $\rho$ indicates a sensed value, and $E(\lambda)$, $S(\lambda)$, and $R(\lambda)$ respectively indicate the illumination, the surface reflectance of an object, and the response of a camera as functions of spectrum $\lambda$. Because the sensed values are affected by illumination, the colors of images captured by cameras are also affected by illumination. White balance (WB) refers to a technique or process for eliminating this effect and photographing the unique color of an object as much as possible.

An image capturing apparatus including a smartphone includes a plurality of image sensors. For example, an image capturing apparatus may include an ultra-wide angle, wide angle, standard, and telephoto image sensors. Such image sensors have different individual illumination information, and thus, color-converted images output from respective image sensors may represent different colors. In other words, even being captured by the same image capturing apparatus, images may be represented in different colors.

The image acquisition apparatus may apply common illumination information to a plurality of image sensors, and thus, images output from different image sensors may be represented in the same color.

FIG. 1 is a schematic block diagram of an image acquisition apparatus according to an embodiment.

Referring to FIG. 1, the image acquisition apparatus 1 may include a sensor unit 10 and a processor 500.

The sensor unit 10 includes a plurality of first image sensors 100a to 100n (hereinafter, referred to 100 provided that there is no need to distinguish). The image acquisition apparatus 1 may accurately perform white balancing on an image captured by using at least one first image sensor 100 included in the sensor unit 10.

The first image sensor 100 may acquire a first image of a first wavelength band. For example, the first image sensor 100 may be an RGB image sensor based on a wavelength band of 380 nm to 780 nm. The first image sensor 100 may include a multispectral image (hereinafter, referred to as MSI) sensor based on a wavelength band of 10 nm to 1000 nm. The RGB image sensor may has an R channel, a G channel, and a B channel. An MSI sensor may have more channels than the RGB image sensor. For example, the MSI sensor may have four or more channels so as to sense light of more wavelengths than the RGB image sensor.

Hereinafter, the description is provided under the assumption that the first image sensor 100 includes the RGB image sensor, but in some embodiments, the first image sensor 100 may include the MSI sensor.

The processor 500 may acquire an image from at least one first image sensor 100 from among the plurality of first image sensors 100a to 100n. The processor 500 may estimate common illumination information from the image acquired from the at least one first image sensor 100. The processor 500 may use the common illumination information in white balancing of the first image sensors 100a to 100n included in the sensor unit 10. In other words, the processor 500 may convert color of the image output from each of the first image sensors 100a to 100n based on the common illumination information.

The processor 500 may acquire common illumination information from all of the first image sensors 100a to 100n included in the sensor unit 10. The processor 500 may perform an individual illumination estimation on each of the images output from the first image sensors 100a to 100n, and then may acquire the common illumination information by combining the individual illumination estimations. The processor 500 may perform the white balancing on the images output from the first image sensors 100a to 100n included in the sensor unit 10, based on the common illumination information.

The processor 500 may acquire the common illumination information from one first image sensor 100a included in the sensor unit 10, and may perform the white balancing on the images output from all of the first image sensors 100a to 100n included in the sensor unit 10 based on the common illumination information.

Figure 2:
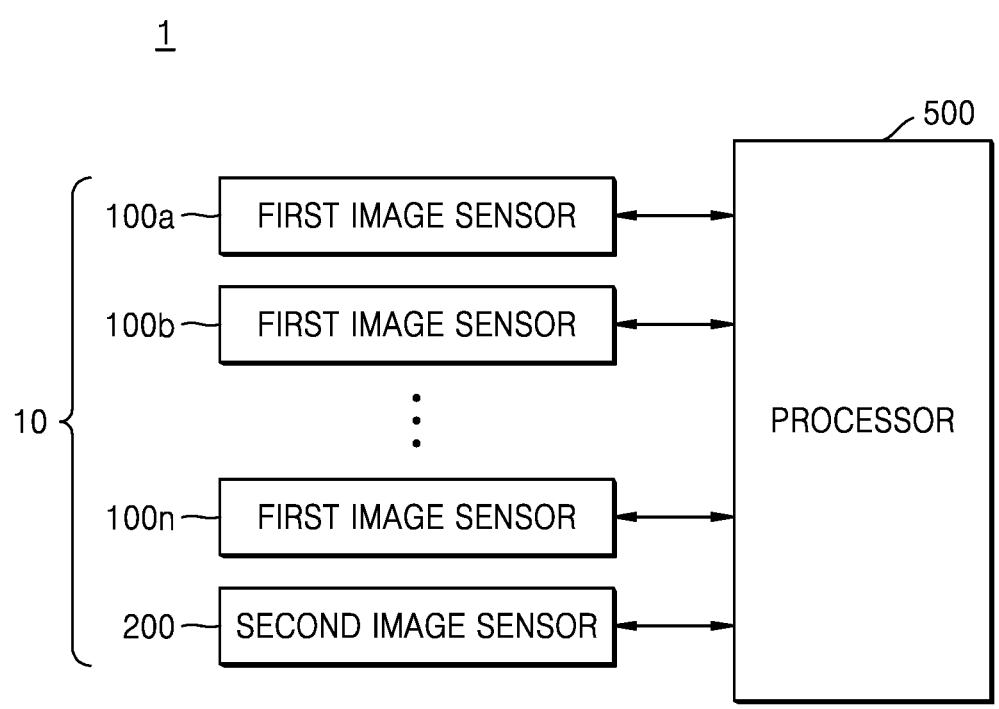
FIG. 2 is a schematic block diagram of an image acquisition apparatus according to another embodiment.

FIG. 2 is a schematic block diagram of an image acquisition apparatus according to another embodiment.

FIG. 2 differs from FIG. 1 in that the image acquisition apparatus 1 further includes a second image sensor 200 that is different from the first image sensor 100. Referring to FIG. 2, the image acquisition apparatus 1 may include the sensor unit 10 and the processor 500.

The sensor unit 10 may include the plurality of first image sensors 100a to 100n, and the second image sensor 200. In FIG. 2, a single second image sensor 200 is shown, but in some embodiments, a plurality of second image sensors may be provided. The image acquisition apparatus 1 may perform white balancing on captured images more accurately by using the second image sensor 200 included in the sensor unit 10.

The first image sensor 100 may acquire a first image of a first wavelength band. The second image sensor 200 includes the first wavelength band and acquires second images by splitting the spectrum of the light into the second wavelength band more than the first wavelength band. For example, the first image sensor 100 may be an RGB image sensor based on a wavelength band of 380 nm to 780 nm. Also, the second image sensor 200 may include the MSI sensor based on the wavelength band of about 10 nm to about 1000 nm. The RGB image sensor may has an R channel, a G channel, and a B channel. An MSI sensor may have more channels than the RGB image sensor. For example, the MSI sensor may have four or more channels so as to sense light of more wavelengths than the RGB image sensor.

The processor 500 may estimate the common illumination information from the second image obtained from the second image sensor 200. The processor 500 may perform the white balancing on the images output from the first image sensors 100a to 100n included in the sensor unit 10, based on the common illumination information.

The image acquisition apparatus 1 may separate the illumination from the color of the object by using the MSI sensor splitting the light spectrum into more wavelength bands, and performs color conversion or color mapping on the RGB image by using the information of the illumination. Thus, more accurate white balancing may be performed.

Figure 3:
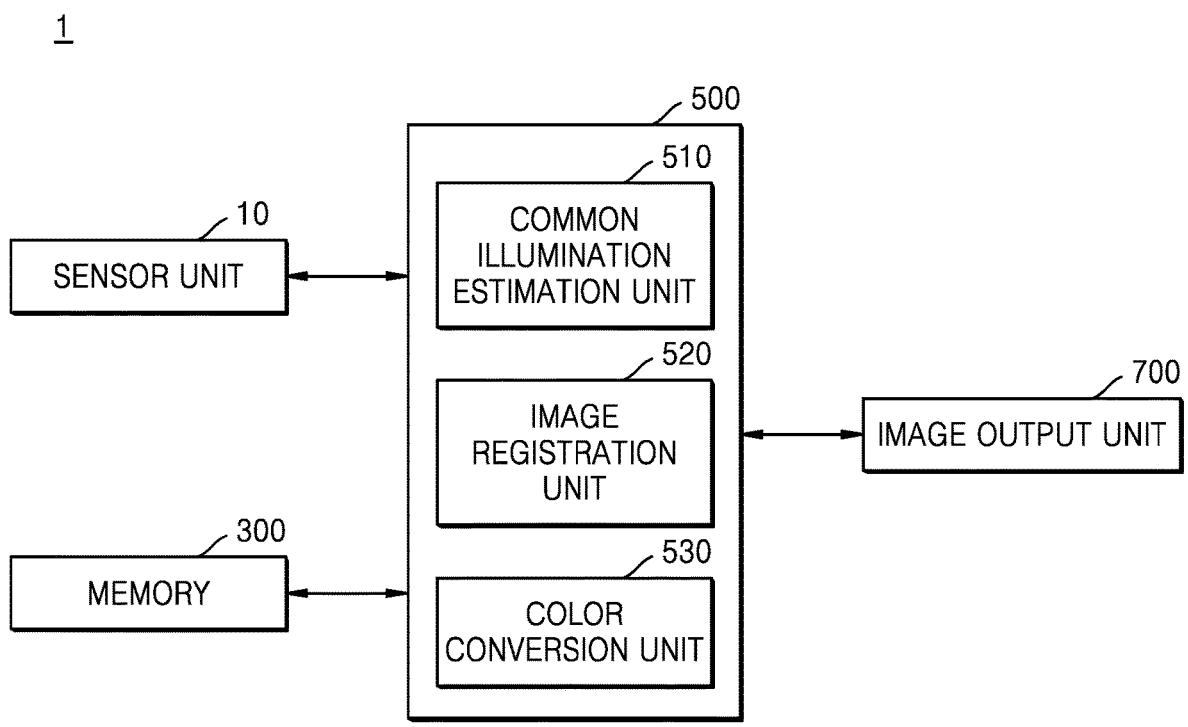
FIG. 3 is a detailed block diagram of the image acquisition apparatus shown in FIGS. 1 and 2.

FIG. 3 is a detailed block diagram of the image acquisition apparatus shown in FIG. 1.

Referring to FIG. 3, the image acquisition apparatus 1 includes the sensor unit 10, a memory, the processor 500, and an image output unit 700. The sensor unit 10 may correspond to the sensor unit 10 of FIG. 1 or the sensor unit 10 of FIG. 2.

The sensor unit 10 may include the first image sensors 100a to 100n.

The first image sensors 100a to 100n may be sensors adopted in a general RGB camera, and may each include a complementary metal oxide semiconductor (CMOS) image sensor using a Bayer color filter array. The image acquired by the first image sensor 100 may be an RGB image based on red, green, and blue.

The first image sensors 100a to 100n may be sensors that sense light of more wavelengths than that of the RGB sensor. The first image sensor 100 may include, for example, an MSI sensor using four, sixteen, thirty-one channels, or another number of channels. A bandwidth of each channel may be narrower than R, G, and B band, and a total bandwidth obtained by adding the band widths of all channels in the MIS sensor may include the total bandwidth of the RGB image sensor and may be greater than the bandwidth of the RGB image sensor. For example, the MSI sensor may have a bandwidth of about 10 nm to about 1000 nm. The image acquired by the MSI sensor may be a multispectral or hyperspectral image, and may be an image based on wavelengths in 16 or more channels into which a wavelength band wider than the RGB wavelength bands is divided, for example, a wavelength band including the visible wavelength band and ranging from the ultraviolet wavelength band to the infrared wavelength band is divided. The image acquired by the MSI sensor may be acquired using all available channels or may be acquired using selected certain channels. Also, the image acquired by the MSI sensor may be acquired through binning of pixels or selecting and synthesizing of certain channels. A spatial resolution of the image acquired by the MSI sensor may be lower than that of the image acquired by the RGB sensor, but is not limited thereto.

The sensor unit 10 may include the first image sensors 100a to 100n and the second image sensor 200. The first image sensor 100 may be an RGB sensor and the second image sensor 200 may be an MSI sensor. The first image sensor 100 and the second image sensor 200 may be configured as separate chips or as a single chip. When operating two different types of sensors, timing control may be required according to the different resolutions and output speeds of the sensors and the size of a region required for image registration. For example, when reading one RGB image column, an image column of the MSI sensor corresponding to the region may be stored in advance in a buffer or may be newly read. The sensed signals may be readout by calculating the above timing. Alternatively, operations of the two sensors may be synchronized by using the same synchronization signal. In addition, focusing may be controlled so that the two sensors may be focused on a subject at the same position.

The memory 300 stores the images readout from the sensor unit 10. The memory 300 may include a plurality of memory devices connected respectively to the image sensors. The memory devices may be located outside the sensors or may be integrated in the sensors. When integrating the memory devices in the sensor, the memory 300 may be integrated with a sensor circuit, and a pixel portion and a circuit portion, that is, the other portion, and the memory 300 may be configured as stacks and integrated as two-stack to form one chip. Alternatively, the memory 300 may be implemented as three-stack including three layers of the pixel portion, the circuit portion, and the memory. In each sensor, the images are readout in a line unit and sequentially stored in the memory 300. The memory 300 may be a line memory storing the images in units of each line or a frame buffer storing entire images. The processor 500 may only output the RGB images when outputting images and store some RGB images in the frame buffer, and may store the MSI sensor images in a line buffer and processes the images in the line unit. After that, the RGB images in the frame buffer may be updated. The memory 300 may include a static random access memory (SRAM) or dynamic random access memory (DRAM), but kinds of the memory 300 are not limited thereto.

The processor 500 may include a common illumination estimation unit 510, an image registration unit 520, and a color conversion unit 530. Although not shown in the drawings, the processor 500 may further include an image signal process (ISP). The ISP may perform basic image processing on images, after acquiring the image in the sensor unit 10 and before or after storing the image in each memory 300. For example, the ISP may perform bad pixel correction, fixed pattern noise correction, crosstalk reduction, remosaicing, demosaicing, false color reduction, denoising, distortion correction, and/or chromatic aberration correction. Also, the ISP may perform the same image processing with respect to all of the sensors included in the sensor unit 10 or different image processings with respect to the respective sensors.

The common illumination estimation unit 510 may estimate the common illumination information based on the image acquired from the sensor unit 10. The common illumination information may be an illumination vector corresponding to an intensity of the illumination spectrum, an XYZ vector representing the color of illumination, an RGB vector representing the color of illumination, color temperature of the illumination, or a index value representing illumination information stored in advance. Alternatively, the common illumination information may denote an image including an illumination value. The image may include the illumination information at each pixel position.

The common illumination estimation unit 510 may perform the illumination estimation in a pixel unit of the image. Alternatively, the common illumination estimation unit 510 may divide the image into pixel groups and perform the illumination estimation for each region. The pixel groups used herein may be the same as those used in the image registration unit 520. The common illumination estimation unit 510 may estimate the common illumination information for each pixel by interpolating the illumination information for each region obtained from the divided regions. The interpolation method may include a bilinear interpolation, but is not limited thereto. For example, when a difference between the illumination values of adjacent regions, from among the illumination values estimated for the respective regions of the images, is equal to or greater than a first threshold value, the common illumination estimation unit 510 may adjust one illumination value between the illumination values of the adjacent regions so that the difference is less than the first threshold value. In this case, the common illumination estimation unit 510 may perform a post-processing on a boundary portion between the adjacent regions after performing the color conversion.

The common illumination estimation unit 510 may perform the common illumination estimation by using all the images acquired by the first image sensors 100a to 100n. Individual illumination estimation may be performed on each image acquired by the first image sensors 100a to 100n and then results are mixed to estimate the common illumination information.

The common illumination estimation unit 510 may acquire individual illumination information with respect to each of the images output from the plurality of first image sensors 100a to 100n. A method of acquiring the individual illumination information will be described later with reference to Equation 2 to Equation 9 below.

The common illumination estimation unit 510 may register the individual illumination information in order to obtain the common illumination information. The common illumination estimation unit 510 may overlay, based on a first image output from any one first image sensor 100, a second image output from another first image sensor 100. The common illumination estimation unit 510 may search the second image for pixels corresponding to respective pixels of the first image. To do this, the common illumination estimation unit 510 may perform, for example, scaling, translation, rotation, affine transform, and/or perspective transform. on the pixels of the second image. Also, there may be one or more pixels in the second image, corresponding to the pixel of the first image, and the common illumination estimation unit 510 may generate a pixel value of the second image corresponding to the pixel of the first image by mixing a plurality of pixels of the second image in a certain ratio. The common illumination estimation unit 510 may perform the registration in a sub-pixel unit in order to improve the precision in the registration. In the registration of the sub-pixel unit, the position of pixel may be expressed in a real number, not in an integer.

The common illumination estimation unit 510 may register the individual illumination information based on at least one of a focal length and a field of view (FOV) of the first image sensors 100a to 100n. For example, the sensor unit 10 may include the first image sensors 100a to 100n having focal lengths of 9 mm to 18 mm, 18 mm to 36 mm, 36 mm to 73 mm, and 73 mm to 147 mm, and the common illumination estimation unit 510 may overlay the individual illumination information in an order in which the focal lengths increase. The sensor unit 100 may include the first image sensors 100a to 100n having the FOV of 16° to 32°, 32° to 60°, 60° to 99°, and 99° to 133°, and the common illumination estimation unit 510 may overlay the individual illumination information in an order in which the FOV decreases. When the focal length of the first image output from any one first image sensor 100 is less than that of the second image output from another first image sensor 100 or the FOV of the first image is greater than that of the second image, the common illumination estimation unit 510 may generate a second image sample corresponding to each pixel position in the first image for each channel through extrapolation. Likewise, the common illumination estimation unit 510 may perform, for example, the extrapolation in consideration of edge information such as bi-lateral filtering, and/or guided filtering. The common illumination estimation unit 510 may acquire the common illumination information in which the chrominance of the overlaid individual illumination information has the minimum value.

The common illumination estimation unit 510 may acquire the individual illumination information from any one image from among the images output from the plurality of first image sensors 100a to 100n. Also, the common illumination estimation unit 510 may use the individual illumination information acquired from any one image as the common illumination information for the color conversion.

A method of acquiring the individual illumination information will be described later with reference to Equation 2 to Equation 9 below.

The sensor unit 10 may include the first image sensor 100 based on the first wavelength band and the second image sensor 200 including the first wavelength band and based on more wavelength bands than the first wavelength band, and the common illumination estimation unit 510 may use the image output from the second image sensor 200 as the common illumination information for the color conversion. A method of acquiring the common illumination information will be described later with reference to Equation 2 to Equation 9 below.

The common illumination estimation unit 510 may perform illumination estimation with respect to at least one image sensor by using the spectrum information of channels included in the first image sensor 100 and/or the second image sensor 200. To do this, the illumination and the surface reflectance of the object may be obtained through the spectral decomposition, and thus, illumination E may be expressed by equation 2 and color S of the object may be expressed by equation 3 below $$E^x(\lambda) = \sum_{i=1}^{m} \epsilon_i^x E_i(\lambda) \quad \text{[Equation 2]}$$

$$S^x(\lambda) = \sum_{j=1}^{n} \sigma_j^x S_j(\lambda) \quad \text{[Equation 3]}$$

A product of the above two equations indicates the color, and a value sensed by the first image sensor 100 and/or the second image sensor 200 may be expressed by equation 4 below.

$$\rho_k^x = \int E^x(\lambda) S^x(\lambda) R_k(\lambda) d\lambda = \sum_{i=t}^{m} \sum_{j=1}^{n} \epsilon_i^x \sigma_j^x g_{ijk} \quad \text{[Equation 4]}$$

$$g_{ijk} \equiv \int E_i^x(\lambda) S_j^x(\lambda) R_k(\lambda) d\lambda$$

As seen in equation 4, m and n may be the number of basis vectors used when performing spectrum decomposition of the spectrums of the illumination and the color of the object, x may denote a spatial position, and k may denote each channel index of the sensor. The processor 500 may estimate the spectrum of the illumination by calculating the value of the linear equation by using, for example, a non-linear optimization technique. The processor 500 may estimate the individual illumination information of each of the first image sensor 100 and/or the second image sensor 200 according to equation 2 to equation 4 above.

The processor 500 may overlay the individual illumination information of the first image sensors 100a to 100n, and may estimate the common illumination information by which the chrominance among the overlaid individual illumination information is the minimum. The processor 500 may estimate the individual illumination information of any one of the first image sensors 100 as the common illumination information. The processor 500 may estimate the individual illumination information of the second image sensor 200 as the common illumination information.

Also, selectively, the common illumination estimation unit 510 may perform the illumination estimation by using the neural network. The common illumination estimation unit 510 may establish the neural network trained with the sensor image with respect to a preset illumination value, and perform the common illumination estimation. After the training, the images from the first image sensor 100 and/or the second image sensor 200 is input to the neural network, and the common illumination information is output from the neural network. To this end, the common illumination estimation unit 510 may further include a deep-learning network.

The common illumination estimation unit 510 may input the images acquired by the sensor unit 10 to the deep-learning network. The input may be three multi-channel images acquired by the RGB sensor and/or may be a multi-channel image of four or more channels acquired by the MSI sensor. For example, the common illumination estimation unit 510 may input all the multi-channel images into the deep-learning network or may generate more channels through interpolation and input the channels into the deep-learning network. When inputting the channel images, the common illumination estimation unit 510 may sample the wavelength bands at certain intervals and input the samples into the deep-learning network. The intervals may be uniform. Also, the common illumination estimation unit 510 may normalize the channel images and input into the deep-learning network. The common illumination estimation unit 510 may input a part or entire captured image into the deep-learning network. Also, the common illumination estimation unit 510 may input the input image into the deep-learning network after scaling the input image or may simultaneously input a scaled image and a non-scaled image into the deep-learning network.

The deep-learning network may include at least three convolution layers, a rectified linear unit function (ReLU) that is a following activation function, and a max pooling. The deep-learning network may be trained by comparing illumination information estimated with respect to, for example, each input image, and/or an angular error value of a ground-truth illumination.

The common illumination estimation unit 510 may calculate an estimated light source ($L_{estimation}$) from CCNet as shown in equation 5 below, and then, calculates a reflectivity map (R) from an observation image ($I_{observe}$). In addition, a white balance image may be reconstructed by multiplying R by a standard illuminant spectrum ($L_{desired_e}$).

$$L_{estimation} = CCNet(I) \quad \text{[Equation 5]}$$

$$R = I_{observe}/L_{estimation}$$

$$I_{output} = R \times L_{desired}$$

The deep-learning network may be trained by the supervised learning method, and a parameter of the network is optimized through the evaluation between a ground truth illumination spectrum vector with respect to the input image and an estimated illumination spectrum vector output from the network. The network aims at minimizing an error between an actual value and the estimated value of the network. A regression for estimating an illumination spectrum vector may be used.

A loss function for evaluation of learning may use one or more of angular loss, L1 loss (MAE loss), and L2 loss (MSE loss).

The deep-learning network may aim at learning of schematic shape of an illumination spectrum by using angular loss (cosine similarity loss (π)). In illumination estimation, the magnitude of illumination refers to relative brightness (intensity), and it is important to learn the relative difference between illumination values of channels instead of learning an absolute magnitude of illumination. The angular loss only considers the difference between relative orientations of vectors, not the magnitudes of vectors, and thus, is suitable for considering the above-mentioned characteristics of illumination. Therefore, by using angular loss, considering only the orientations of vectors, not the magnitudes of vectors, in a backpropagation, the learning efficiency of the deep-learning network may be improved.

The deep-learning network may use a loss function including angular loss (angular error) described above, L1 loss, and L2 loss. L1 loss (MAE) and L2 loss (MSE) that are commonly used as loss functions in regression models may be used along with the angular loss.

Angular loss may be defined as equation 6 below.

$$\text{Angular Loss} = a\cos\left(\frac{L_{GT} \cdot L_{estimation}}{norm(L_{GT}) norm(L_{estimation})}\right) \quad \text{[Equation 6]}$$

L1 loss may be defined as equation 7 below.

$$\text{MAE Loss} = \frac{1}{N}\sum_{i}^{N}|L_{GT} - L_{estimation}| \quad \text{[Equation 7]}$$

L2 loss may be defined as equation 8 below.

$$\text{MSE Loss} = \frac{1}{N}\sum_{i}^{N}(L_{GT} - L_{estimation})^2 \quad \text{[Equation 8]}$$

As seen in Equation 8, $L_{GT}$ may denote ground truth illumination information of an input image and $L_{estimation}$ may denote illumination information of an output image.

The deep-learning network may use a composite data sample in order to increase the size of a data set for training. The composite data sample is configured as follows.

A reflectance map R may be acquired by one or more of following methods. The deep-learning network may acquire a ground-truth value and estimate the reflectance map R from an image acquired under the illumination of a controlled environment or under the sunlight of a daytime environment.

Composite illumination denotes a random illumination spectrum and may be calculated by equation 9 below.

Random illumination spectrum =     [Equation 9]

$$a_1 L_A + a_2 L_{D65} + a_3 L_{LED} + a_4 L_{Flu}$$

As seen in Equation 9, a1, a2, a3, and a4 may be randomly generated weight values, and $L_A$, $L_{D65}$, $L_{LED}$, and $L_{Flu}$ denote illumination spectrums of incandescent illumination, daytime illumination, LED illumination, and fluorescent illumination. Also, certain random noises may be added.

A composite image may be obtained by multiplying composite illumination calculated by equation 9 above by the reflectance map R. An output illumination vector may be calculated by inputting an input image to the CCNet and performing a convolution operation. In this case, one network estimates illumination by looking at all input images, and thus, the estimation may be referred to as a global illumination estimation. In addition to the global illumination estimation, a local illumination estimation method may be used as follows.

According to the local illumination estimation method, input images may be cut in units of patches and input. In the local illumination estimation method, when the input images are cut in units of patches and input, the patches may be selectively input. For example, in the local illumination estimation method, when a particular object or a color histogram is included in a patch, the patches may be input to the illumination estimation network. The illumination spectrums that are locally obtained are all added to construct a final result illumination. Alternatively, the local illumination estimation method may construct the final result illumination by selectively adding the locally obtained illumination spectrums. Alternatively, locally obtained illumination spectra may be weighted-summed to construct final illumination. Alternatively, locally-obtained illumination spectra may be bandpass-filtered such that only some of the locally-obtained illumination spectrums may remain, and then remaining illumination spectrums may be added together to construct final illumination.

In addition, optionally, the common illumination estimation unit 510 may use global illumination estimation results and local illumination estimation results along with each other.

Also, the common illumination estimation unit 510 may acquire both the global regions and local regions of input images by using kernel sizes of a plurality of networks and downscale factors of the input images, and may estimate the final illumination estimation results.

The common illumination estimation unit 510 may output the illumination estimation results. The results of performing illumination estimation in the common illumination estimation unit 510 may be represented as a function of an illumination according to the wavelength. Alternatively, the illumination estimation results may be expressed as coefficients of each basic function when performing the spectrum decomposition of the illumination function according to the wavelength with respect to a predefined basis function. Also, the illumination estimation results may be expressed by color temperature index of the illumination. The color temperature is a method of numerically expressing the light from the illuminant and is expressed in units of K (Kelvin). The color temperature varies depending on the kinds of illumination, and when the color temperature decreases, red color is shown, and when the color temperature increases, blue color is represented.

Also, the common illumination estimation unit 510 may define a set of illumination functions according to wavelengths in advance, and output an index of a most approximate function from among the set of functions. When using the neural network, the outputs may be defined as described above, and the neural network is constructed by being trained with the set outputs.

Also, the common illumination information output from the common illumination estimation unit 510 may be an image including an illumination value, and the illumination value may be one of the color temperature of the illumination, an illumination vector corresponding to an intensity of the illumination spectrum, an XYZ vector representing the color of illumination, an RGB vector representing the color of illumination, and an index value indicating the illumination information stored in advance.

The image registration unit 520 may register the image output from a target image sensor, in which the color conversion is to be performed, and the common illumination information. The common illumination information may be illumination information acquired from the first image sensors 100a to 100n. The common illumination information may be the illumination information acquired from one first image sensor 100. The common illumination information may be the illumination information acquired from the second image sensor 200.

When the common illumination information is acquired from all of the first image sensors 100a to 100n, the image registration unit 520 may register the common illumination information and an image output from one first image sensor 100, in which the color conversion is to be performed, based on an edge and features of the image. When the common illumination information is the illumination information acquired from one first image sensor 100 or illumination information acquired from one second image sensor 200, the image registration unit 520 may utilize relative positional information between a reference image sensor from which the common illumination information is acquired and a target image sensor in which the color conversion is to be formed so as to perform a primary image registration of images output from respective sensors. The image registration unit 520 may perform the primary image registration based on at least one of positional information, resolution, optical axis, FOV, and focal length of each image sensor. Also, the image registration unit 520 performs a secondary image registration of the common illumination information and the image output from one first image sensor 100, in which the color conversion is to be performed, based on the edge and features of the image.

The image registration unit 520 may identify positional relationship between pixels in the image in consideration of the common illumination information and the spatial resolution of the images acquired by the target image sensor, for example, an FOV, focal length. of an optical system used to acquire the images. The image registration unit 520 may overlay another image on one image based on the one image. For example, the image registration unit 520 may find, with respect to each pixel in a first image including the common information, corresponding pixels of a second image of a target image sensor. To do this, the image registration unit 520 may perform, for example, scaling, translation, rotation, affine transform, and/or perspective transform. on the pixels of the second image. Also, there may be one or more pixels in the second image, corresponding to the pixel of the first image, and the image registration unit 520 may generate a pixel value of the second image corresponding to the pixel of the first image by mixing a plurality of pixels of the second image in a certain ratio. The image registration unit 520 may perform the image registration by using the image for each channel in the second image. The image registration unit 520 may perform the registration in a sub-pixel unit in order to improve the precision in the registration. In the registration of the sub-pixel unit, the position of pixel may be expressed in a real number, not in an integer.

The image registration unit 520 may improve the efficiency of registration by allowing the first and second images to be focused on an object at the same position through a focusing control. In addition, the image registration unit 520 may allow the two images to have the same field of view so that the image registration may be performed rapidly and accurately. For example, when the first image and the second image have the same FOV, there is only the translation between the first and second images, and a related parameter may be calculated by using the relative position between the reference image sensor and the target image sensor and the focal lengths of the respective optical systems.

When the spatial resolution of the second image is greater than that of the first image, the image registration unit 520 may perform the image registration through down-sampling of the second image. The image registration unit 520 may perform the image registration more accurately by performing the down-sampling using the filtering considering the edge information, e.g., bi-lateral filtering or guided filtering.

When the spatial resolution of the second image is less than that of the first image, the image registration unit 520 may generate a second image sample corresponding to each pixel position of the first image, for each channel through interpolation. Likewise, the image registration unit 520 may perform the interpolation while considering the edge information as in the bi-lateral filtering or guided filtering.

Alternatively, the image registration unit 520 may perform the image registration after making the spatial resolution of the second image identical with the spatial resolution of the first image. The image registration unit 520 may perform a demosaicing so that the resolutions of the two images are the same as each other. In this case, when the two images have the same focal lengths and the FOV, the image registration unit 520 may perform the image registration unit 520 only by considering the translation without performing an additional interpolation. For example, when the reference image sensor and the target image sensor have the same focus and the same FOV, the translation only occurs between the images acquired by the above sensors, and translation parameters may be calculated by using a camera extrinsic parameter including relative locations between two sensors and a camera intrinsic parameter including the focal length.

The image registration unit 520 may correct aberrations included in the first and second images before performing the registration. That is, image registration unit 520 may perform, for example, the registration after correcting the influences of distortion, geometric aberrations, and/or chromatic aberration, which are caused by lenses of the imaging optical systems used to acquire the first image and the second image.

The image registration unit 520 may extract edge feature information from the images and may perform feature matching between the two images. Because color distortion may occur when image registration is not correct in a boundary region of an object, the image registration unit 520 may perform the image registration by using extracted edge information to align edges of two images, thereby preventing distortion in a boundary region between the two images. Image registration may be performed by using image features such as corner points other than edge features.

In addition, the image registration unit 520 may perform image registration on a pixel group basis instead of a pixel basis. A pixel group may have a pattern of set size and shape. The pattern may be, for example, a line shape or a rectangular block shape. The pixel groups may be classified as a foreground object region and a background region. The pixel groups may be classified as a region of interest (hereinafter, referred to as an ROI) and a non-ROI. Also, the pixel groups may be classified by considering image segmentation or color distribution.

The color conversion unit 530 may perform the color conversion by using the common illumination information estimated by the common illumination estimation unit 510 with respect to the image registered by the image registration unit 520.

The color conversion unit 530 may perform a white balancing by calculating an illumination vector in a color space of an image and dividing each color pixel value of the image by each element value of the illumination vector. For example, when the white balancing is performed with respect to an RGB image, the color conversion unit 530 calculates an RGB vector [r, g, b] from the spectrum of illumination and corrects each pixel value [Ri, Gi, Bi] of the RGB image as expressed by [Ri/r, Gi/g, Bi/b]. Alternatively, the color conversion unit 530 may correct the image by using a conversion equation considering a cross-channel conversion as expressed by [Ri', Gi', Bi']'=M[Ri, Gi, Bi]', where M is a 3×3 conversion matrix. Also, the color conversion unit 530 may make an optimized matrix through a non-linear optimization using the illumination function, in order to obtain more accurate results. Also, when a normalized input is input, the color conversion unit 530 may restore the image by multiplying the normalized input by a scale value. When the wavelength band of a channel of an input signal is different from the wavelength band of a channel of an output signal, the color conversion unit 530 may restore the image through interpolation from the channel of the output signal. The color conversion unit 530 may also correct the color in the same method when the white balancing is performed on the MSI image.

The color conversion unit 530 may prevent boundary artifacts from occurring at a boundary between adjacent regions after the color conversion for each region. To this end, the color conversion unit 530 may set a difference between illumination functions of adjacent regions not to be greater than a preset value. Also, the color conversion unit 530 may generate smooth color conversion through post-processing of boundary regions after the color conversion. Also, the color conversion unit 530 may perform gamma correction or another color correction on the color-converted image.

The image output unit 700 may output the image that is color-converted by the color conversion unit 530 to outside. The output image may be transferred to an external memory, an application processor, or a certain display.

Figure 4:
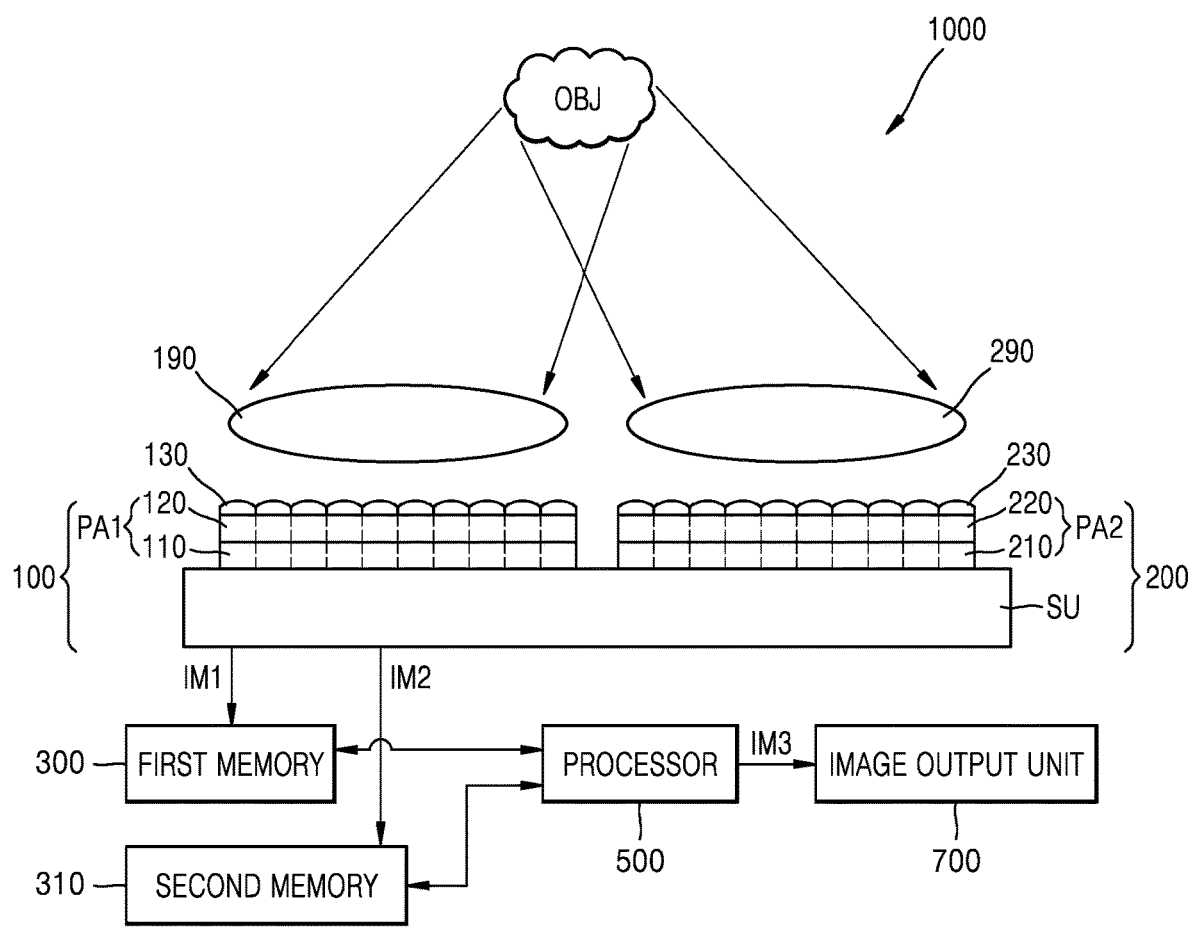
FIG. 4 is a conceptional diagrams showing a schematic structure of the image acquisition apparatus shown in FIG. 1.
Figure 5:
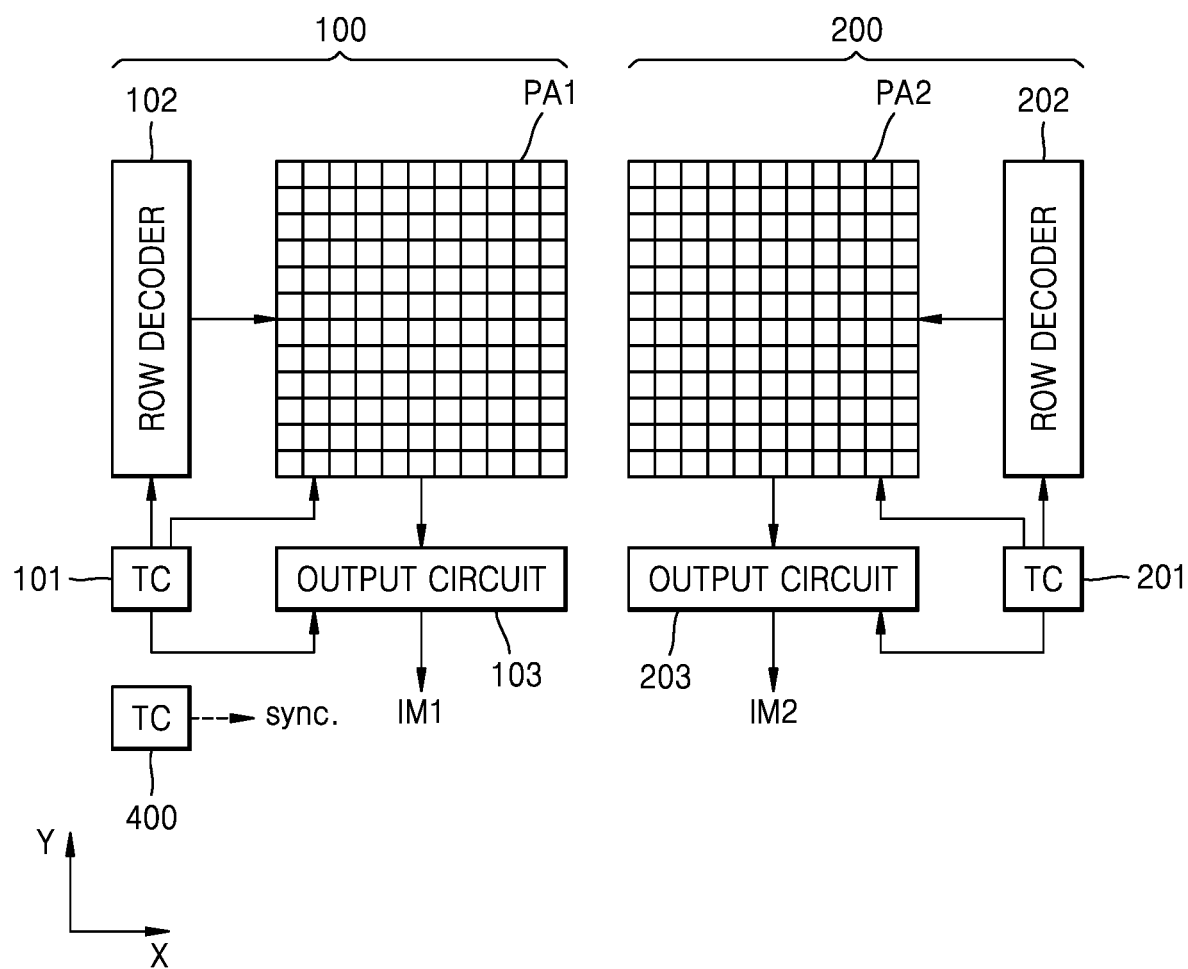
FIG. 5 is a diagram showing a circuit configuration of a first image sensor and a second image sensor included in an image acquisition apparatus according to an embodiment.

FIG. 4 is a conceptional diagram showing a schematic configuration of an image acquisition apparatus according to an embodiment, and FIG. 5 is a diagram showing a circuit configuration of a first image sensor and a second image sensor included in the image acquisition apparatus according to the embodiment.

The image acquisition apparatus 1000 of FIGS. 4 and 5 may correspond to the image acquisition apparatus 1 of FIGS. 1 to 3. Also, a first memory 300 and a second memory 310 in FIGS. 4 and 5 may correspond to the memory 300 of FIGS. 1 to 3. The image acquisition apparatus 1000 includes the first image sensor 100 acquiring a first image IM1 based on a first wavelength band. The image acquisition apparatus 1000 may further include the second image sensor 200 based on the second wavelength band. The first wavelength band may range from 380 nm to 780 nm, or from 10 nm to 1000 nm. Also, the second wavelength band may range from about 10 nm to about 1000 nm. Hereinafter, for convenience of description, an example in which the first wavelength band ranges from 380 nm to 780 nm and the second wavelength band ranges from 10 nm to 1000 nm is described, but the first wavelength band may be 10 nm to 1000 nm in some embodiments. Also, the image acquisition apparatus 1000 includes the processor 500 that generates a third image by performing a signal processing on the first image IM1 and/or the second image IM2. The image acquisition apparatus 1000 may further include the first memory 300 storing data about the first image IM1 and the second memory 310 storing data about the second image IM2, and an image output unit 700 outputting images.

The image acquisition apparatus 1000 may include a first imaging optical system 190 configured to form an optical image of an object OBJ on the first image sensor 100, and a second imaging optical system 290 configured to form an optical image of the object OBJ on the second image sensor 200. The first imaging optical system 190 and the second imaging optical system 290 each include one lens as an example, but the embodiment is not limited thereto.

The first image sensor 100 may include a first pixel array PA1, and the first pixel array PA1 may include a first sensor layer 110 in which a plurality of first sensing elements are arrayed and a color filter 120 arranged on the first sensor layer 110. The color filter 120 may include red filters, green filters, and blue filters that are alternately arranged. A first micro-lens array 130 may be arranged on the first pixel array PA1. Various examples of pixel arrangement applied to the first pixel array PA1 will be described later with reference to FIGS. 7 to 9.

The second image sensor may include a second pixel array PA2, and the second pixel array PA2 includes a second sensor layer 210 in which a plurality of second sensing elements are arrayed, and a spectral filter 220 arranged on the second sensor layer 210. The spectral filter 220 may include a plurality of filter groups, each of which may include a plurality of unit filters having different transmission wavelength bands. The spectral filter 220 may be configured to perform filtering in a wavelength band wider than that of the color filter 120, for example, a wavelength band ranging from an ultraviolet wavelength band to an infrared wavelength band by dividing the wavelength band into more sub-bands than sub-bands in which the color filter 120 filters light. A second micro-lens array 230 may be arranged on the second pixel array PA2. Examples of the pixel arrangement applied to the second pixel array PA2 will be described later with reference to FIGS. 11 to 13.

The first sensor layer 110 and the second sensor layer 210 may each include, but are not limited to, a charge coupled device (CCD) or a complementary metal oxide semiconductor (CMOS).

The first pixel array PA1 and the second pixel array PA2 may be horizontally arranged on a same circuit board SU, for example, apart from each other in an X direction.

The circuit board SU may include first circuit elements processing a signal from the first sensor layer 110, and second circuit elements for processing a signal from the second sensor layer 210. However, one or more embodiments are not limited thereto, and the first and second circuit elements may be respectively provided on separate substrates.

Although the first and second memories 300 and 310 in which data about the first image IM1 and the second image IM2 are stored are shown separately from the circuit board SU, but this is an example, and the memories 300 and 310 may be arranged in the same layer as or separate layer from those of the circuit elements in the circuit board SU. The memories 300 and 310 may be line memories storing an image in a line unit or frame buffers storing the entire image. The memories 300 and 310 may each include a static random access memory (SRAM) or a dynamic random access memory (DRAM).

Various circuit elements that are desireable for the image acquisition apparatus 1000 may be integrated into the circuit board SU. For example, the circuit board SU may include a logic layer including, for example, various analog circuits, and/or digital circuits, and a memory layer storing data. The logic layer and the memory layer may be provided in different layers or the same layer.

Referring to FIG. 5, a row decoder 102, an output circuit 103, a timing controller (TC) 101 may be connected to the first pixel array PA1. The row decoder 102 selects one of the rows in the first pixel array PA1 in response to a row address signal output from the timing controller 101. The output circuit 103 may output a photosensitive signal, in a line unit, from a plurality of pixels disposed in the selected row. To this end, the output circuit 103 may include a column decoder and an analog-to-digital converter (ADC). For example, the output circuit 103 may include a plurality of ADCs that are disposed respectively to columns between the column decoder and the first pixel array PA1, or one ADC disposed at an output end of the column decoder. The timing controller 101, the row decoder 102, and the output circuit 103 may be implemented as one chip or in separate chips. At least some of the example circuit elements may be provided in the circuit board SU of FIG. 4. A processor for processing the first image IM1 output from the output circuit 103 may be implemented as one chip with the timing controller 101, the row decoder 102, and the output circuit 103.

A row decoder 202, an output circuit 203, and a TC 201 may be connected to the second pixel array PA2, and similarly to the above description, the signal from the second pixel array PA2 may be processed. Also, a processor for processing the second image IM2 output from the output circuit 203 may be implemented as one chip with the TC 201, the row decoder 202, and the output circuit 203.

Although the first pixel array PA1 and the second pixel array PA2 are shown to have the same size and the same number of pixels, this is an example for convenience of description and one or more embodiments are not limited thereto.

When operating two different types of sensors, timing control may be required according to the different resolutions and output speeds of the sensors and the size of a region required for image registration. For example, when one image column is read based on the first image sensor 100, an image column of the second image sensor 200 corresponding thereto may have already been stored in a buffer or may need to be newly read. Alternatively, operations of the first image sensor 100 and the second image sensor 200 may be synchronized using the same synchronization signal. For example, the circuit may further include a TC 400 so as to transfer a synchronization signal (sync.) to the first image sensor 100 and the second image sensor 200.

Figure 6:
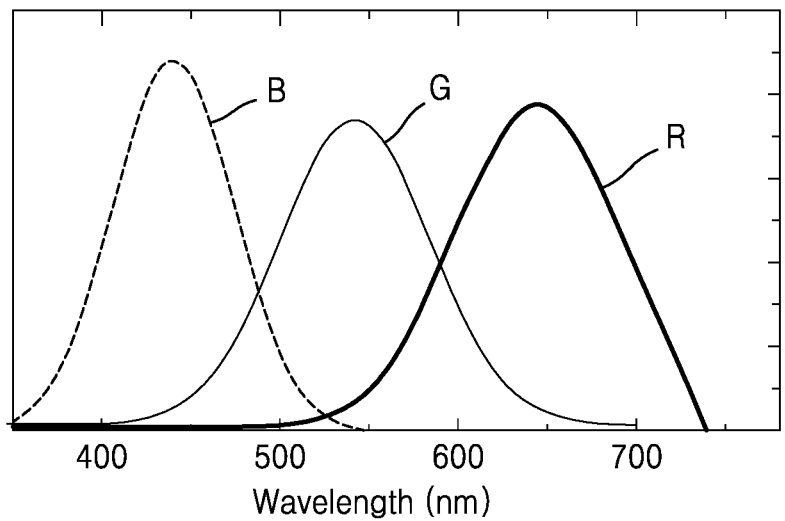
FIG. 6 is a diagram showing a wavelength spectrum according to the first image sensor included in an image acquisition apparatus according to an embodiment.
Figure 7:
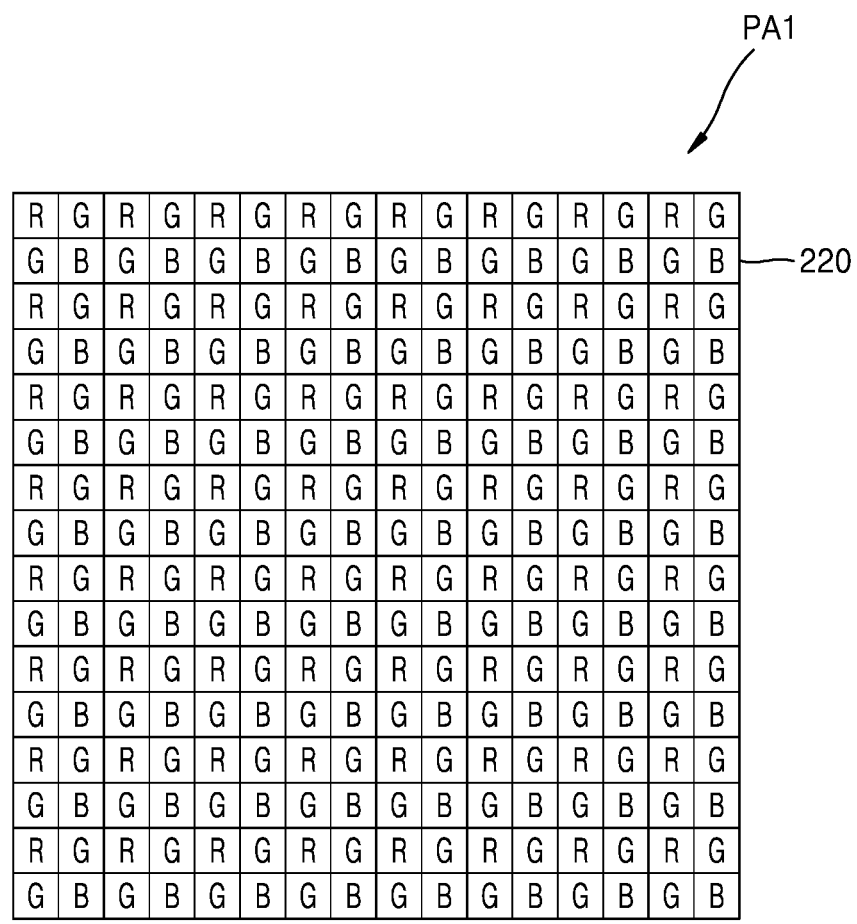
FIGS. 7 to 9 are diagrams showing examples of pixel arrangements in a first image sensor included in an image acquisition apparatus according to an embodiment.
Figure 8:
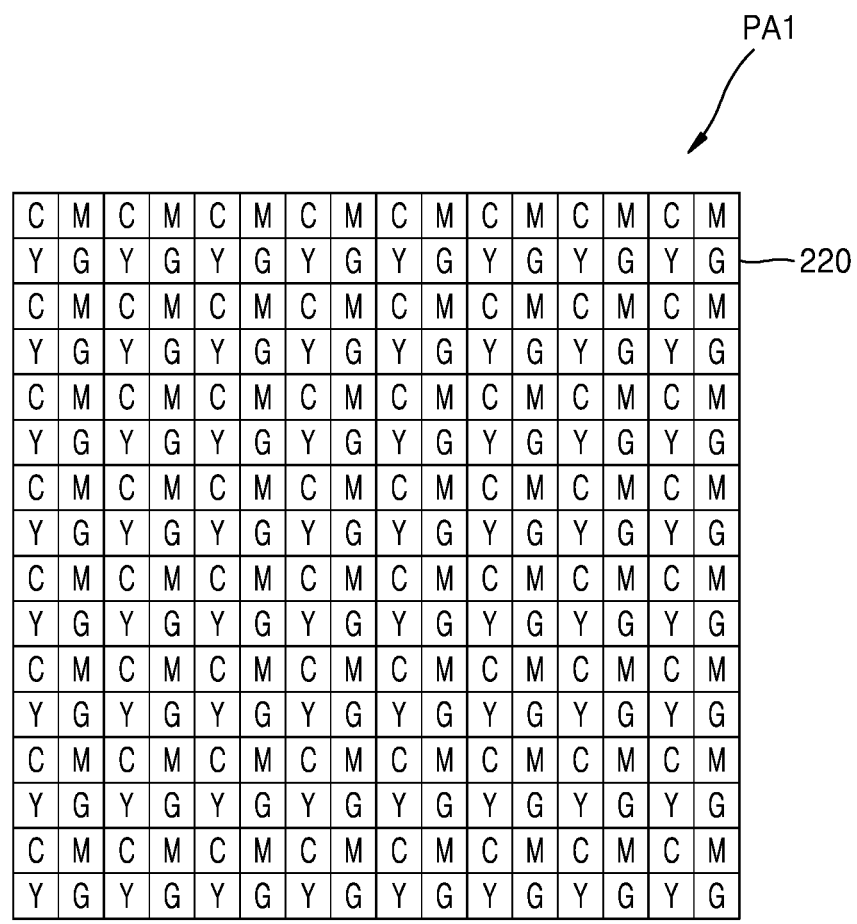
Figure 9:
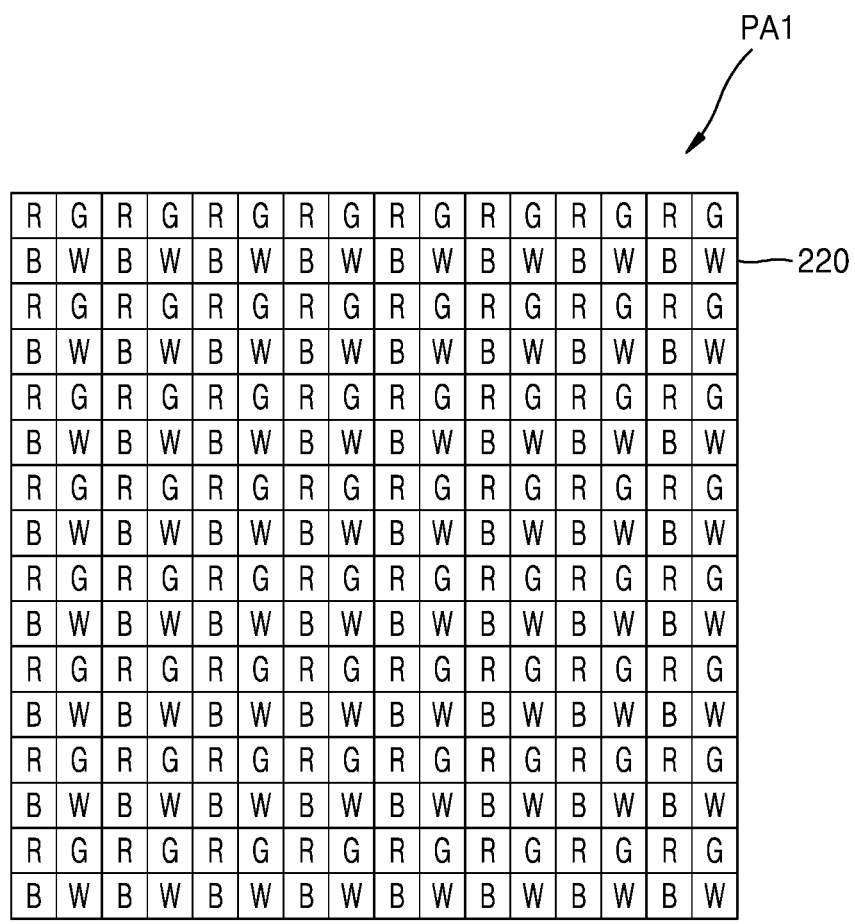

FIG. 6 is a diagram showing a wavelength spectrum obtained with the first image sensor 100 included in the image acquisition apparatus 1000 according to the embodiment, and FIGS. 7 to 9 are diagrams showing example pixel arrangements of the first image sensor included in the image acquisition apparatus 1000 according to the embodiment. The color filter 220 of FIGS. 7 to 9 may correspond to the color filter 120 of FIG. 4.

Referring to FIG. 7, in the color filter 220 provided in the first pixel array PA1, filters for filtering in red (R), green (G), and blue (B) wavelength bands may be arranged in a Bayer pattern. That is, one unit pixel includes sub-pixels arranged in a 2×2 array, and a plurality of unit pixels may be two-dimensionally and repeatedly arranged. A red filter and a green filter are arranged in a first row of a unit pixel, and a green filter and a blue filter are arranged in a second row. The pixels may be arranged in other patterns than the Bayer pattern.

For example, referring to FIG. 8, a CYGM arrangement, in which a magenta pixel M, a cyan pixel C, a yellow pixel Y, and a green pixel G configure one unit pixel, may be used. Also, referring to FIG. 9, an RGBW arrangement, in which a green pixel G, a red pixel R, a blue pixel, and a white pixel W configure one unit pixel, may be used. Although not shown in the drawings, the unit pixel may have 3×2 array. In addition to the above examples, the pixels in the first pixel array PA1 may be disposed in various ways according to color characteristics of the first image sensor 100.

Figure 10:
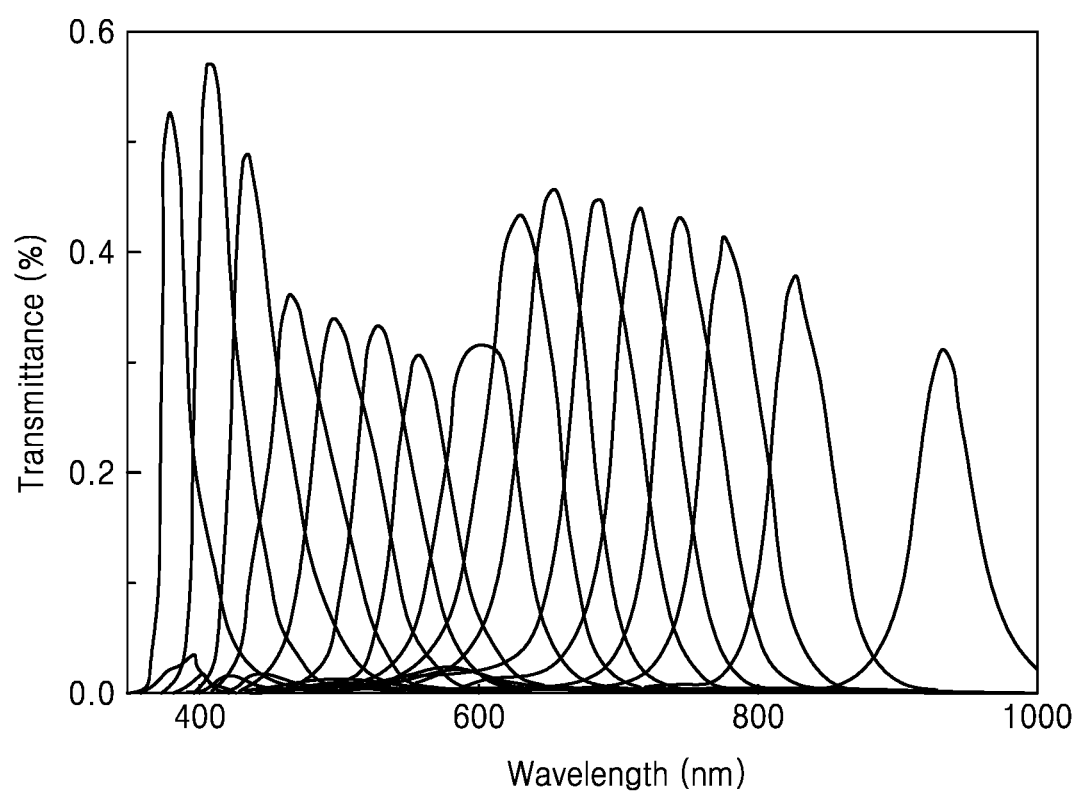
FIG. 10 is a diagram showing a wavelength spectrum according to the second image sensor included in an image acquisition apparatus according to an embodiment.
Figure 11:
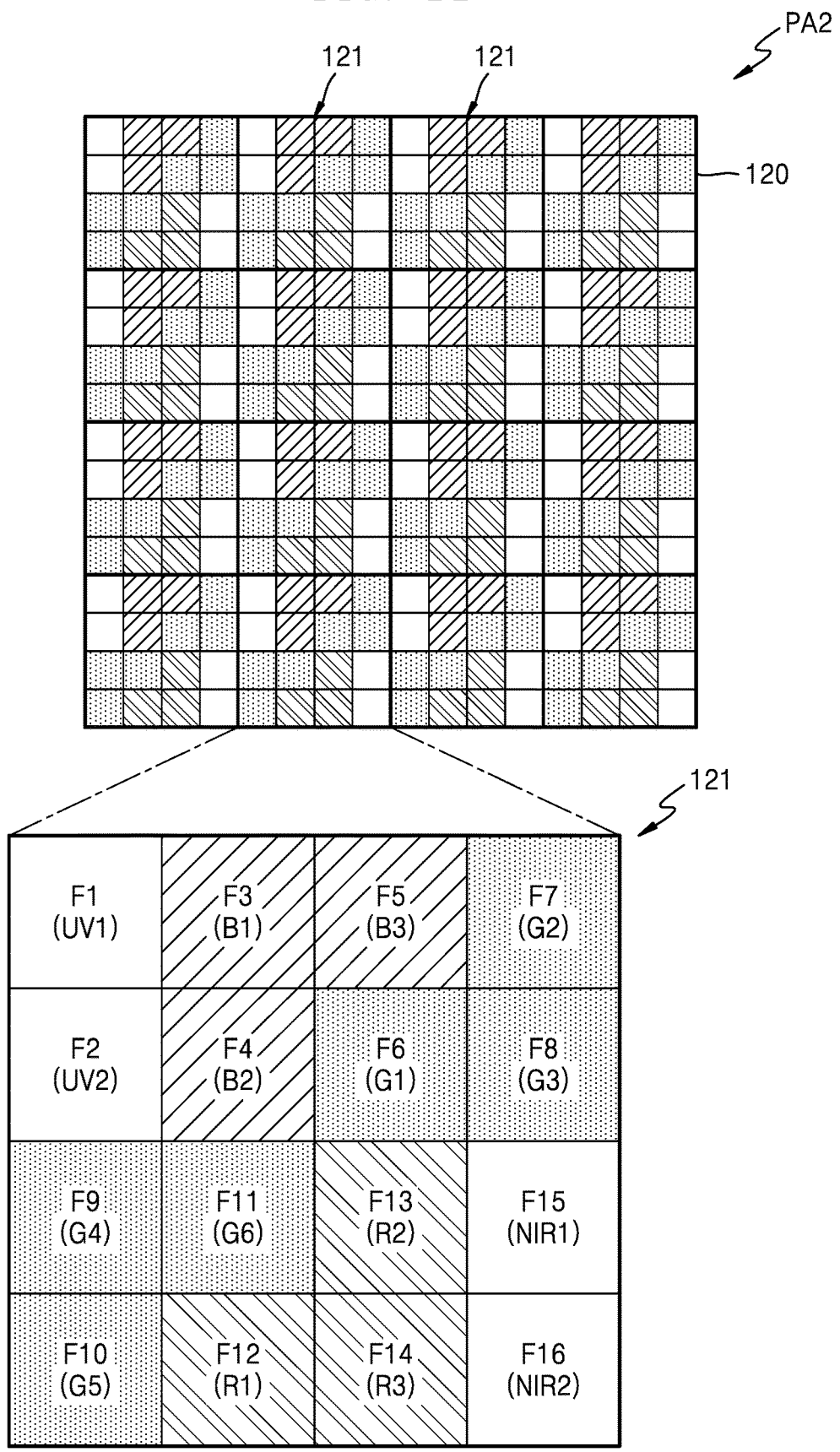
FIGS. 11 to 13 are diagrams showing examples of pixel arrangements in a second image sensor included in an image acquisition apparatus according to another embodiment.
Figure 12:
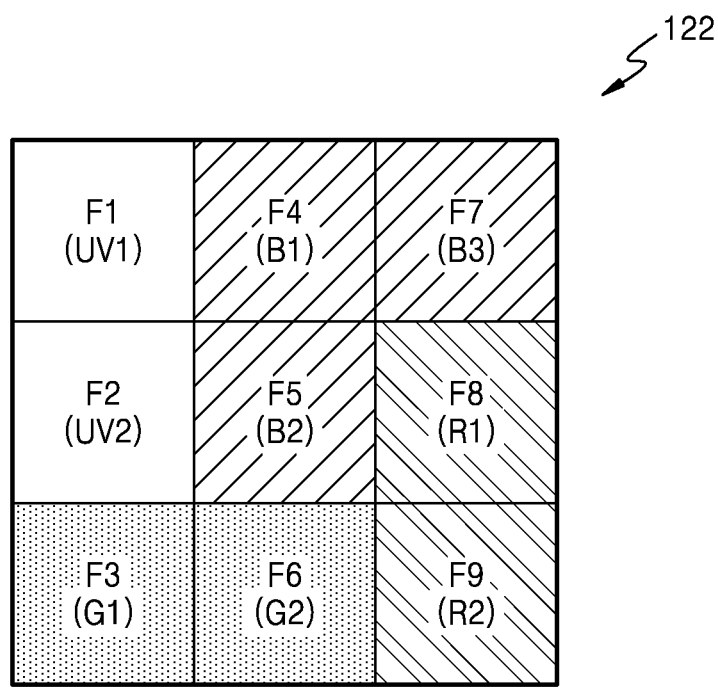
Figure 13:
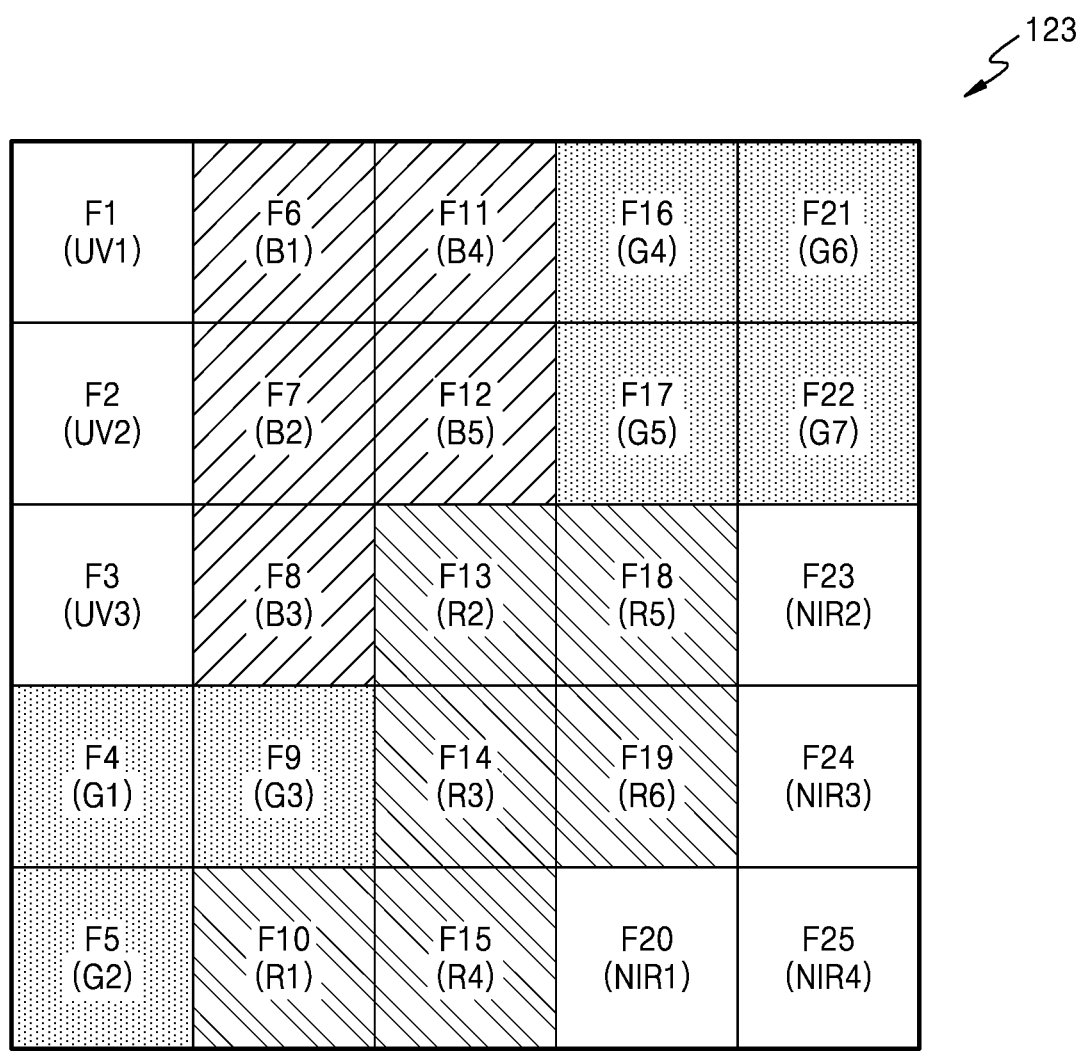

FIG. 10 is a diagram showing a wavelength spectrum obtained with the second image sensor 200 included in the image acquisition apparatus 1000 according to the embodiment, and FIGS. 11 to 13 are diagrams showing example pixel arrangements of the second image sensor included in the image acquisition apparatus 1000 according to the embodiment. The spectral filter 120 of FIGS. 11 to 13 may correspond to the spectral filter 220 of FIG. 4.

Referring to FIG. 11, the spectral filter 120 provided in the second pixel array PA2 may include a plurality of filter groups 121 arranged two-dimensionally. Each filter group 121 may include 16 unit filters F1 to F16 arranged in a 4×4 array.

First and second unit filters F1 and F2 may have center wavelengths UV1 and UV2 of an ultraviolet region, and third to fifth unit filters F3 to F5 may have center wavelengths B1 to B3 of blue light region. Sixth to eleventh unit filters F6 to F11 may have center wavelengths G1 to G6 of green light region, and twelfth to fourteenth unit filters F12 to F14 may have center wavelengths R1 to R3 of red light region. In addition, fifteenth and sixteenth unit filters F15 and F16 may have center wavelengths NIR1 and NIR2 of near-infrared ray region.

FIG. 12 is a plan view showing one filter group 122 provided in the spectral filter 120 according to another example. Referring to FIG. 12, the filter group 122 may include nine unit filters F1 to F9 arranged in a 3×3 array. The first and second unit filters F1 and F2 may have center wavelengths UV1 and UV2 of an ultraviolet region, and the fourth, fifth, and seventh unit filters F4, F5, and F7 may have center wavelengths B1 to B3 of blue light region. The third and sixth unit filters F3 and F6 may have the center wavelengths G1 and G2 of green light region, and the eighth and ninth unit filters F8 and F9 may have the center wavelengths R1 and R2 of the red light region.

FIG. 13 is a plan view showing one filter group 123 provided in the spectral filter 120 according to another example. Referring to FIG. 13, the filter group 123 may include 25 unit filters F1 to F25 arranged in a 5×5 array. The first to third unit filters F1 to F3 may have center wavelengths UV1 to UV3 of the ultraviolet ray region, and the sixth, seventh, eighth, eleventh, and twelfth unit filters F6, F7, F8, F11, and F12 may have center wavelengths B1 to B5 of the blue light region. The fourth, fifth, and ninth unit filters F4, F5, and F9 may have the center wavelengths G1 to G3 of the green light region, and the tenth, thirteenth, fourteenth, fifteenth, eighteenth, and nineteenth unit filters F10, F13, F14, F15, F18, and F19 may have the center wavelengths R1 to R6 of the red light region. In addition, the twentieth, twenty-third, twenty-fourth, and twenty-fifth unit filters F20, F23, F24, and F25 may have the wavelengths NIR1 to NIR4 of the near infrared ray region.

The above unit filters provided in the spectral filter 120 may have a resonance structure having two reflection plates, and the transmission wavelength band of the spectral filter 120 may be determined according to the characteristics of the resonance structure. The transmission wavelength band may be adjusted according to the material of the reflection plate, a dielectric material in a cavity, and the thickness of the cavity. The above filters may implement the unit filters by using, for example, a structure using a grating, a structure using a nanostructure, and/or a structure using a distributed bragg reflector (DBR).

In addition, the pixels of the second pixel array PA2 may be arranged in various manners according to color characteristics of the second image sensor 200.

Figure 14:
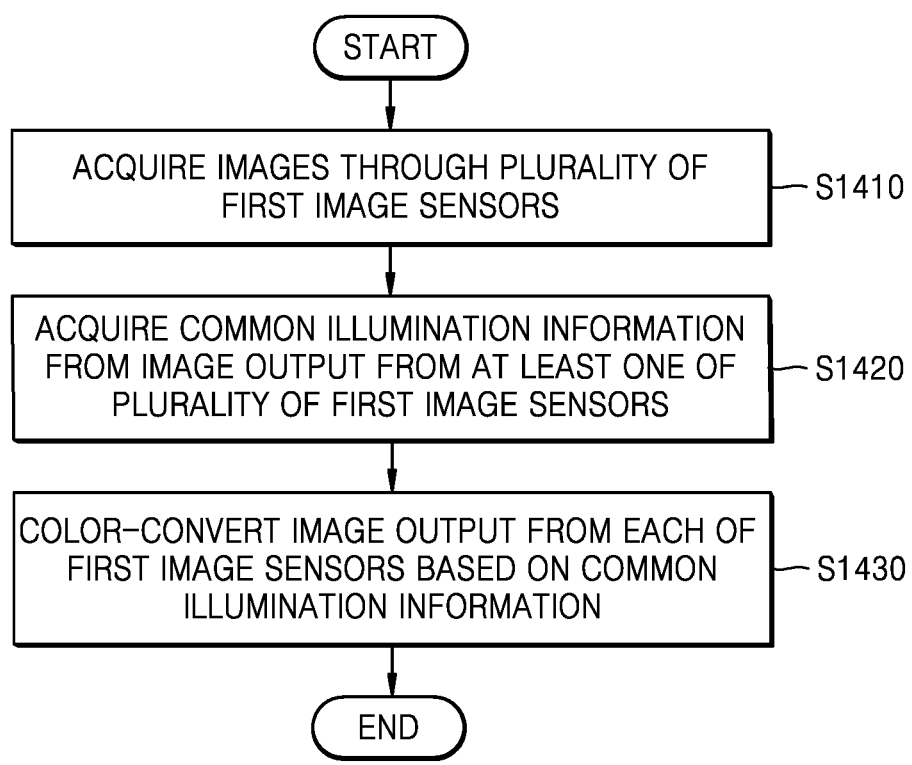
FIG. 14 is a flowchart schematically illustrating a method of controlling an image acquisition apparatus, according to an embodiment.

FIG. 14 is a flowchart schematically illustrating a method of controlling an image acquisition apparatus, according to an embodiment.

Referring to FIG. 14, in operation S1410, the processor 500 may acquire images through the plurality of first image sensors 100a to 100n.

The plurality of first image sensors 100a to 100n may acquire images based on the first wavelength band. For example, the plurality of first image sensors 100a to 100n may be RGB image sensors based on the wavelength band of 380 nm to 780 nm. In another example, the plurality of first image sensors 100a to 100n may be MSI sensors based on the wavelength band of 10 nm to 1000 nm.

Each of the plurality of first image sensors 100a to 100n may have at least one of the focal length and the FOV that is different from the other. The plurality of first image sensors 100a to 100n may have different focal lengths. For example, the focal length of each of the plurality of first image sensors 100a to 100n may range from 9 mm to 18 mm, 18 mm to 36 mm, 36 mm to 73 mm, and 73 mm to 147 mm. The plurality of first image sensors 100a to 100n may have different FOVs. For example, each of the plurality of first image sensors 100a to 100n may have an FOV of 16° to 32°, 32° to 60°, 60° to 99°, and 99° to 133°.

The processor 500 may be configured to improve the images generated by the plurality of first image sensors 100a to 100n. For example, the processor 500 may perform bad pixel correction, fixed pattern noise correction, crosstalk reduction, remosaicing, demosaicing, false color reduction, denoising, distortion correction, and/or chromatic aberration correction, for image improvement. Also, the processor 500 may be configured to perform the same image process on all of the plurality of first image sensors 100a to 100n or perform different image processes respectively for the sensors.

In operation S1420, the processor 500 may acquire the common illumination information from the image output from at least one of the plurality of first image sensors 100a to 100n.

The sensor from which the common illumination information is acquired may be referred to as a reference image sensor. Also, the image from which the common illumination information is acquired may be referred to as a reference image. As described later, when the common illumination information is acquired from one first image sensor 100, one first image sensor 100 is the reference image sensor and the image output from the reference image sensor may be the reference image. When the common illumination information is acquired from the plurality of first image sensors 100a to 100n, all of the plurality of first image sensors 100a to 100n are the reference image sensors. Also, the image including the common illumination information is acquired from the images output from the plurality of first image sensors 100a to 100n that are overlaid, and the image including the common illumination information may be the reference image.

The common illumination information may be an illumination vector corresponding to an intensity of the illumination spectrum included in the reference image, an XYZ vector representing the color of illumination, an RGB vector representing the color of illumination, color temperature of the illumination, or an index value representing illumination information stored in advance. Alternatively, the common illumination information may denote an image including an illumination value. The image may include the illumination information at each pixel position. Alternatively, the common illumination information may include an illumination map representing illumination information for each region or pixel group in the reference image.

The processor 500 may be configured to acquire individual illumination information from each of the images output from the plurality of first image sensors 100*a* to 100*n*, and to estimate the common illumination information by combining the individual illumination information.

The processor 500 may acquire individual illumination information with respect to each of the images output from the plurality of first image sensors 100*a* to 100*n*. The individual illumination information may be acquired based on the basis vector of the reference image, the spatial position, and the channel index as expressed by equation 2 to equation 4 above. Alternatively, the individual illumination information may be acquired by inputting the reference image into the deep-learning network as in equation 5 to equation 9 above.

The processor 500 may divide the image into pixel groups and perform the illumination estimation for each region. The processor 500 may perform the illumination estimation with respect to a certain region, and then may estimate the entire individual illumination information by interpolating the adjustment information estimated from adjacent other regions, with respect to the other regions. For example, the processor 500 may estimate the entire individual illumination information by using a linear interpolation method, according to distances of the regions that are adjacent to a certain region.

The processor 500 may overlay the individual illumination information based on the positional relationship between pixels of the individual illumination information. The processor 500 may overlay the individual illumination information in an order in which the focal lengths increase or in an order in which the FOVs decrease. The processor 500 may perform a post-process so that the color may not be suddenly changed at the boundary region of the overlay. The processor 500 may acquire common illumination information from the overlaid individual illumination information. For example, the processor 500 may acquire common illumination information by which the chrominance among the overlaid individual illumination information is the smallest. The processor 500 may acquire the common illumination information by inputting the images output from the plurality of first image sensors 100*a* to 100*n* into the deep-learning network that is trained in advance in equation 5 to equation 9 above.

The processor 500 may estimate the individual illumination information of any one of the first image sensors 100 as the common illumination information. The method of acquiring the individual illumination information is the same as the method of acquiring the individual illumination information according to the above-described embodiment.

In addition, when a wide angle image (e.g., focal length of 18 mm to 36 mm and FOV of 60° to 99°) is used as the reference image, a telephoto image (e.g., focal length of 73 mm to 147 mm and FOV of 16° to 32°) may be included in the wide angle image, and thus, the processor 500 may perform the color conversion on the telephoto image by using the common information estimated from the wide angle image. However, when the wide angle image is used as the reference image, a part of a ultra-wide angle image (e.g., focal length of 9 mm to 18 mm and FOV of 99° to 133°) is not included in the wide angle image, and thus, the processor 500 may estimate the common illumination information with respect to the ultra-wide angle image through extrapolation. In other words, when the focal length of the reference image sensor from which the common illumination information is acquired is greater than the focal length of the target image sensor on which the color conversion is to be performed, the processor 500 may estimate the common illumination information with respect to the target image sensor through the extrapolation. Alternatively, when the FOV of the reference image sensor from which the common illumination information is acquired is less than the FOV of the target image sensor on which the color conversion is to be performed, the processor 500 may estimate the common illumination information with respect to the target image sensor through the extrapolation.

In operation S1430, the processor 500 may convert color of the image output from each of the first image sensors 100*a* to 100*n* based on the common illumination information.

The processor 500 registers the first image output from the reference image sensor and the second image output from the target image sensor. The first image output from the reference image sensor may denote the common illumination information. The processor 500 may register the first image and the second image by using camera extrinsic parameters including relative positions between the reference image sensor and the target image sensor, and camera intrinsic parameters including the focal lengths. Also, the processor 500 may register the first image and the second image by using an edge and features of each of the first image and the second image.

After registering the first image and the second image, the processor 500 may perform the color conversion for each of the images output from the first image sensors 100*a* to 100*n*. The processor 500 may perform the color conversion for each pixel in the image. Alternatively, the processor 500 may perform the color conversion for each pixel group of a certain size. Alternatively, the processor 500 may set a region of interest (ROI) and perform the color conversion for each ROI.

The processor 500 may calculate an illumination vector in a color space of an image from each of the first image sensors 100*a* to 100*n*, and may perform the white balancing by dividing each color pixel value or pixel group value of the image by each element value of the illumination vector.

The processor 500 may convert the color space into a desired color space through the color transform, or may additionally perform, for example, a gamma correction or a color correction.

Figure 15:
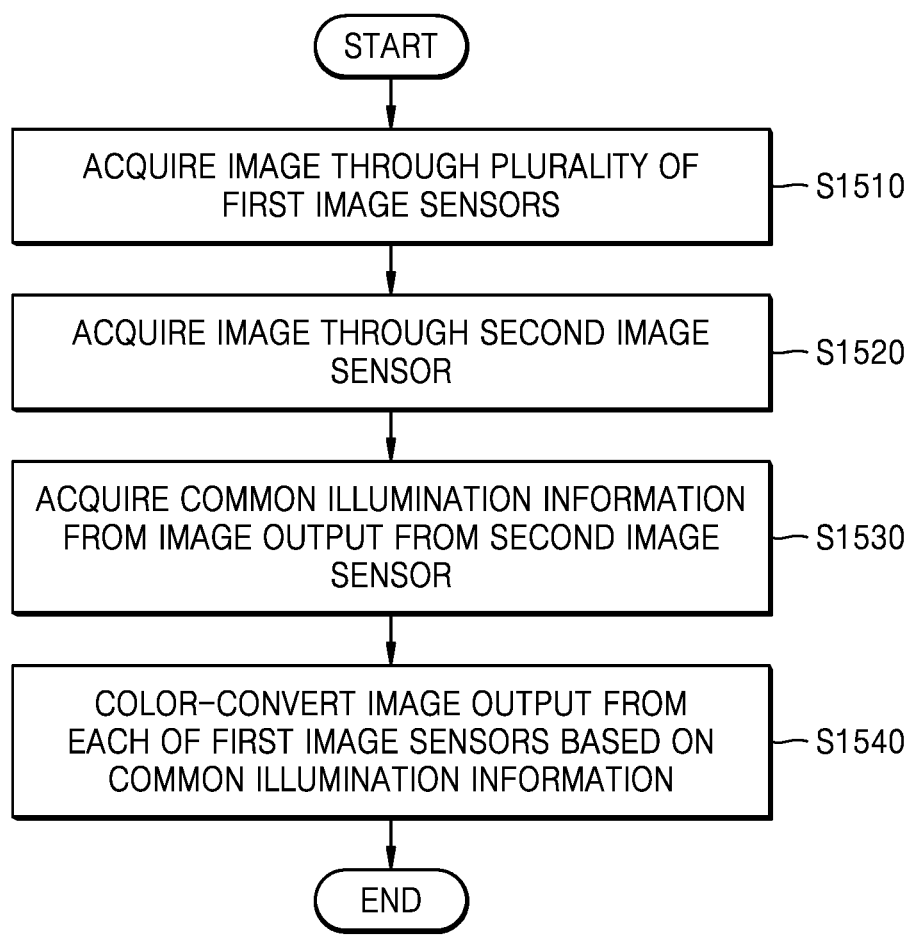
FIG. 15 is a flowchart schematically illustrating a method of controlling an image acquisition apparatus, according to another embodiment.

FIG. 15 is a flowchart schematically illustrating a method of controlling an image acquisition apparatus, according to another embodiment. FIG. 15 differs from FIG. 14 in that the common illumination information is estimated through the second image sensor 200 that is distinguished from the first image sensor 100. Hereinafter, descriptions provided above with reference to FIG. 14 are omitted.

Referring to FIG. 15, in operation S1510, the processor 500 may acquire images through the plurality of first image sensors 100*a* to 100*n*.

The plurality of first image sensors 100*a* to 100*n* may acquire images based on the first wavelength band. For example, the plurality of first image sensors 100a to 100n may be RGB image sensors based on the wavelength band of 380 nm to 780 nm.

In operation S1520, the processor 500 may acquire an image from the second image sensor 200.

The second image sensor 200 may include the MSI sensor based on the wavelength band of about 10 nm to about 1000 nm. The MSI sensor has more channels than the RGB image sensor and may sense light in more wavelength bands. For example, the MSI sensor may use 16 channels. Alternatively, the MSI sensor may use 31 channels.

The MSI sensor may include filters capable of transmitting light of each wavelength band in each channel. Groups of respective filters representing the entire wavelength bands sensed by the MSI sensor are referred to as filter groups or multispectral filter arrays (MSFA). The MSFA may have one-dimensional or two-dimensional arrangement. For example, when the number of channels is 16, the MSFA may have a 4×4 arrangement. Each channel filter or unit filter transmits light of a certain wavelength band, and to do this, the filter may have a resonance structure. The transmission wavelength band of the filter may be determined according to the resonance structure and may be adjusted according to the materials of the reflection plates, a material in a cavity, and the thickness of the cavity. The filter may be implemented using a grating, nanostructure, DBR, or another method.

The image acquired by the MSI sensor may be acquired using all available channels or may be acquired using selected certain channels. Also, only specific channels may be used by binning MSI sensor pixels, or selecting or synthesizing specific channels after acquiring images.

In operation S1530, the processor 500 may acquire common illumination information from the image output from the second image sensor.

The processor 500 may acquire individual illumination information from the image output from the second image sensor 200. The processor 500 may estimate the individual illumination information by using spectrum information consisting of a plurality of channels in the image from the second image sensor. The individual illumination information may be acquired based on the basis vector of the reference image, the spatial position, and the channel index as expressed by equation 2 to equation 4 above. Alternatively, the individual illumination information may be acquired by inputting the reference image into the deep-learning network as in equation 5 to equation 9 above. The processor 500 may estimate the individual illumination information of the second image sensor 200 as the common illumination information.

The processor 500 may estimate the individual illumination information of the second image sensor 200 as the common illumination information.

In operation S1540, the processor 500 may convert color of the image output from each of the first image sensors 100a to 100n based on the common illumination information.

In FIG. 15, the second image sensor 200 from which the common illumination information is acquired may be a reference image sensor, and each of the first image sensors 100a to 100n may be a target image sensor. The processor 500 may register the first image output from the reference image sensor and the second image output from the target image sensor. As shown in FIG. 14, the processor 500 may be configured to perform a primary image registration of the first and second images based on the camera extrinsic parameters and the camera intrinsic parameters and to perform a secondary image registration by using the edges and features of the first and second images.

After registering the first image and the second image, the processor 500 may perform the color conversion for each of the images output from the first image sensors 100a to 100n. The processor 500 may perform the color conversion for each pixel in the image. Alternatively, the processor 500 may perform the color conversion for each pixel group of a certain size. Alternatively, the processor 500 may set a region of interest (ROI) and perform the color conversion for each ROI.

The processor 500 may calculate an illumination vector in a color space with respect to the image from each of the first image sensors 100a to 100n by using the common illumination information obtained from the second image sensor 200, and may perform the white balancing by dividing each color pixel value or pixel group value of the image by each element value of the illumination vector.

The processor 500 may convert the color space into a desired color space through the color transform, or may additionally perform, for example, a gamma correction or a color correction.

Figure 16:
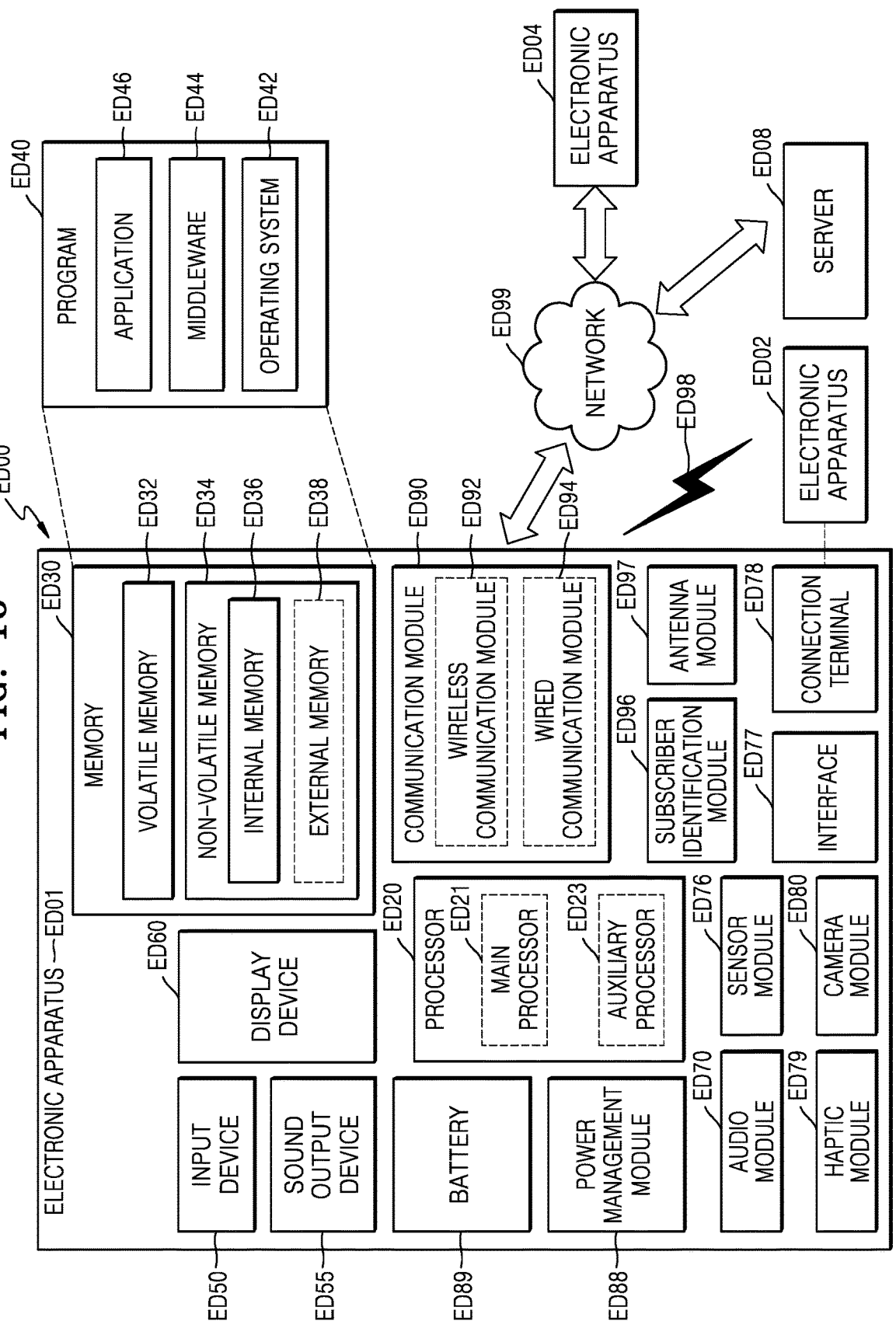
FIG. 16 is a block diagram of an electronic apparatus according to an embodiment.

FIG. 16 is a block diagram of an electronic apparatus according to an embodiment. Referring to FIG. 16, in a network environment ED00, the electronic apparatus ED01 may communicate with another electronic apparatus ED02 via a first network ED98 (e.g., short-range wireless communication network), or may communicate with another electronic apparatus ED04 and/or a server ED08 via a second network ED99 (e.g., long-range wireless communication network) The electronic apparatus ED01 may communicate with the electronic apparatus ED04 via the server ED08. The electronic apparatus ED01 may include a processor ED20, a memory ED30, an input device ED50, a sound output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic apparatus ED01, some (e.g., display device ED60) of the elements may be omitted or another element may be added. Some of the elements may be configured as one integrated circuit. For example, the sensor module ED76 (e.g., a fingerprint sensor, an iris sensor, and/or an illuminance sensor) may be embedded and implemented in the display device ED60 (e.g., display). Also, when the image sensor 1000 includes a spectral function, some of the functions (color sensor, illuminance sensor) of the sensor module may be implemented by the image sensor 1000 itself, not by a separate sensor module.

The processor ED20 may control one or more elements (e.g., hardware, and/or software elements) of the electronic apparatus ED01 connected to the processor ED20 by executing software (e.g., program ED40), and may perform various data processes or operations. As a part of the data processing or operations, the processor ED20 may load a command and/or data received from another element (e.g., sensor module ED76, and/or communication module ED90) to a volatile memory ED32, may process the command and/or data stored in the volatile memory ED32, and may store result data in a non-volatile memory ED34. The processor ED20 may include a main processor ED21 (e.g., central processing unit, and/or application processor) and an auxiliary processor ED23 (e.g., graphic processing unit, image signal processor, sensor hub processor, and/or communication processor) that may be operated independently from or along with the main processor ED21. The auxiliary processor ED23 may use less power than that of the main processor ED21, and may perform specified functions.

The auxiliary processor ED23, on behalf of the main processor ED21 while the main processor ED21 is in an inactive state (sleep state) or along with the main processor ED21 while the main processor ED21 is in an active state (application executed state), may control functions and/or states related to some (e.g., display device ED60, sensor module ED76, and/or communication module ED90) of the elements in the electronic apparatus ED01. The auxiliary processor ED23 (e.g., image signal processor, and/or communication processor) may be implemented as a part of another element (e.g., camera module ED80, and/or communication module ED90) that is functionally related thereto.

The memory ED30 may store various data required by the elements (e.g., processor ED20, and/or sensor module ED76) of the electronic apparatus ED01. The data may include, for example, input data and/or output data about software (e.g., program ED40) and commands related thereto. The memory ED30 may include the volatile memory ED32 and/or the non-volatile memory ED34. The non-volatile memory ED34 may include an internal memory ED36 fixedly installed in the electronic apparatus ED01, and an external memory ED38 that is detachable.

The program ED40 may be stored as software in the memory ED30, and may include an operation system ED42, middleware ED44, and/or an application ED46.

The input device ED50 may receive commands and/or data to be used in the elements (e.g., processor ED20) of the electronic apparatus ED01, from outside (e.g., user) of the electronic apparatus ED01. The input device ED50 may include a microphone, a mouse, a keyboard, and/or a digital pen (stylus pen).

The sound output device ED55 may output a sound signal to outside of the electronic apparatus ED01. The sound output device ED55 may include a speaker and/or a receiver. The speaker may be used for a general purpose such as multimedia reproduction or record play, and the receiver may be used to receive a call. The receiver may be coupled as a part of the speaker or may be implemented as an independent device.

The display device ED60 may provide visual information to outside of the electronic apparatus ED01. The display device ED60 may include a display, a hologram device, or a projector, and a control circuit for controlling the corresponding device. The display device ED60 may include a touch circuitry set to sense a touch, and/or a sensor circuit (e.g., pressure sensor) that is set to measure a strength of a force generated by the touch.

The audio module ED70 may convert sound into an electrical signal or vice versa. The audio module ED70 may acquire sound through the input device ED50, or may output sound via the sound output device ED55 and/or a speaker and/or a headphone of another electronic apparatus (e.g., electronic apparatus ED02) connected directly or wirelessly to the electronic apparatus ED01.

The sensor module ED76 may sense an operating state (e.g., power, temperature) of the electronic apparatus ED01, or an outer environmental state (e.g., user state), and may generate an electrical signal and/or data value corresponding to the sensed state. The sensor module ED76 may include a gesture sensor, a gyro-sensor, a pressure sensor, a magnetic sensor, an acceleration sensor, a grip sensor, a proximity sensor, a color sensor, an infrared (IR) ray sensor, a vivo sensor, a temperature sensor, a humidity sensor, and/or an illuminance sensor.

The interface ED77 may support one or more designated protocols that may be used in order for the electronic apparatus ED01 to be directly or wirelessly connected to another electronic apparatus (e.g., electronic apparatus ED02) The interface ED77 may include a high-definition multimedia interface (HDMI), a universal serial bus (USB) interface, an SD card interface, and/or an audio interface.

The connection terminal ED78 may include a connector by which the electronic apparatus ED01 may be physically connected to another electronic apparatus (e.g., electronic apparatus ED02). The connection terminal ED78 may include an HDMI connector, a USB connector, an SD card connector, and/or an audio connector (e.g., headphone connector).

The haptic module ED79 may convert the electrical signal into a mechanical stimulation (e.g., vibration, motion) or an electric stimulation that the user may sense through a tactile or motion sensation. The haptic module ED79 may include a motor, a piezoelectric device, and/or an electric stimulus device.

The camera module ED80 may capture a still image and a video. The camera module ED80 may include the image capturing apparatus 1000 described above, and may include additional lens assembly, image signal processors, and/or flashes. The lens assembly included in the camera module ED80 may collect light emitted from an object that is an object to be captured.

The power management module ED88 may manage the power supplied to the electronic apparatus ED01. The power management module ED88 may be implemented as a part of a power management integrated circuit (PMIC).

The battery ED89 may supply electric power to components of the electronic apparatus ED01. The battery ED89 may include a primary battery that is not rechargeable, a secondary battery that is rechargeable, and/or a fuel cell.

The communication module ED90 may support the establishment of a direct (wired) communication channel and/or a wireless communication channel between the electronic apparatus ED01 and another electronic apparatus (e.g., electronic apparatus ED02, electronic apparatus ED04, and/or server ED08), and execution of communication through the established communication channel. The communication module ED90 may be operated independently from the processor ED20 (e.g., application processor), and may include one or more communication processors that support the direct communication and/or the wireless communication. The communication module ED90 may include a wireless communication module ED92 (cellular communication module, a short-range wireless communication module, a global navigation satellite system (GNSS) communication module) and/or a wired communication module ED94 (e.g., local area network (LAN) communication module, and/or a power line communication module). From among the communication modules, a corresponding communication module may communicate with another electronic apparatus via a first network ED09 (short-range communication network such as Bluetooth, WiFi direct, or infrared data association (IrDA)) or a second network ED99 (long-range communication network such as a cellular network, Internet, or computer network (e.g., LAN, and/or WAN)). Such above various kinds of communication modules may be integrated as one element (e.g., single chip) or may be implemented as a plurality of elements (a plurality of chips) separately from one another. The wireless communication module ED92 may identify and authenticate the electronic apparatus ED01 in a communication network such as the first network ED98 and/or the second network ED99 by using subscriber information (e.g., international mobile subscriber identifier (IMSI)) stored in the subscriber identification module ED96.

The antenna module ED97 may transmit or receive the signal and/or power to/from outside (e.g., another electronic apparatus). An antenna may include a radiator formed as a conductive pattern formed on a substrate (e.g., PCB). The antenna module ED97 may include one or more antennas. When the antenna module ED97 includes a plurality of antennas, from among the plurality of antennas, an antenna that is suitable for the communication type used in the communication network such as the first network ED98 and/or the second network ED99 may be selected by the communication module ED90. The signal and/or the power may be transmitted between the communication module ED90 and another electronic apparatus via the selected antenna. Another component (e.g., RFIC) other than the antenna may be included as a part of the antenna module ED97.

Some of the elements may be connected to one another via the communication method among the peripheral devices (e.g., bus, general purpose input and output (GPIO), serial peripheral interface (SPI), and/or mobile industry processor interface (MIPI)) and may exchange signals (e.g., commands, data).

The command or data may be transmitted or received between the electronic apparatus ED01 and the external electronic apparatus ED04 via the server ED08 connected to the second network ED99. Other electronic apparatuses ED02 and ED04 may be the devices that are the same as or different kinds from the electronic apparatus ED01. All or some of the operations executed in the electronic apparatus ED01 may be executed in one or more devices among the other electronic apparatuses ED02, ED04, and ED08. For example, when the electronic apparatus ED01 has to perform a certain function or service, the electronic apparatus ED01 may request one or more other electronic apparatuses to perform some or entire function or service, instead of executing the function or service by itself. One or more electronic apparatuses receiving the request execute an additional function or service related to the request and may transfer a result of the execution to the electronic apparatus ED01. To do this, for example, a cloud computing, a distributed computing, or a client-server computing technique may be used.

Figure 17:
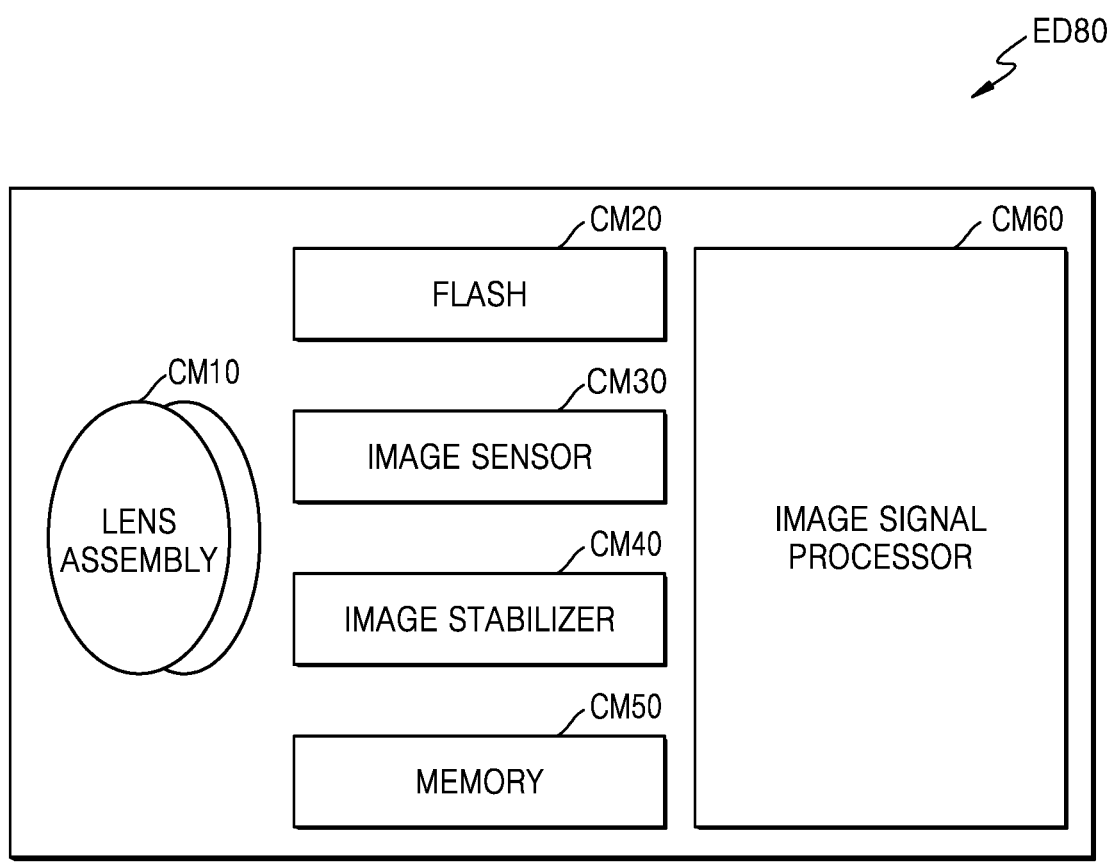
FIG. 17 is a block diagram of a camera module included in the electronic apparatus of FIG. 16.

FIG. 17 is a block diagram of the camera module ED80 included in the electronic apparatus of FIG. 16. The camera module ED80 may include the image capturing apparatus 1000 described above, or may have a modified structure therefrom. Referring to FIG. 17, the camera module ED80 may include a lens assembly CM10, a flash CM20, an image sensor CM30, an image stabilizer CM40, a memory CM50 (e.g., buffer memory), and/or an image signal processor CM60.

The image sensor CM30 may include the first image sensor 100 and the second image sensor 200 included in the image acquisition apparatus 1000 described above. The first image sensor 100 and the second image sensor 200 may convert the light emitted or reflected from the object and transferred through the lens assembly CM10 into an electrical signal to obtain an image corresponding to the object. The first image sensor 100 may acquire the RGB image and the second image sensor 200 may acquire a hyperspectral image in ultraviolet to infrared ray wavelength range.

In addition to the first image sensor 100 and the second image sensor 200 described above, the image sensor CM30 may further include one or more sensors selected from image sensors having different properties, such as another RGB sensor, a black and white (BW) sensor, an infrared ray (IR) sensor, or a UV sensor. Each of the sensors included in the image sensor CM30 may be implemented as a charge coupled device (CCD) sensor and/or a complementary metal oxide semiconductor (CMOS) sensor.

The lens assembly CM10 may collect light emitted from an object, that is, an object to be captured. The camera module ED80 may include a plurality of lens assemblies CM10, and in this case, the camera module ED80 may include a dual camera module, a 360-degree camera, or a spherical camera. Some of the plurality of lens assemblies CM10 may have the same lens properties (e.g., viewing angle, focal length, auto-focus, F number, and/or optical zoom) or different lens properties. The lens assembly CM10 may include a wide-angle lens or a telephoto lens.

The lens assembly CM10 may be configured and/or focusing-controlled so that two image sensors included in the image sensor CM30 may form optical images of an object at the same position.

The flash CM20 may emit light that is used to strengthen the light emitted or reflected from the object. The flash CM20 may include one or more light-emitting diodes (e.g., red-green-blue (RGB) LED, white LED, infrared LED, and/or ultraviolet LED), and/or a Xenon lamp.

The image stabilizer CM40, in response to a motion of the camera module ED80 or the electronic apparatus ED01 including the camera module ED80, may move one or more lenses included in the lens assembly CM10 or the image sensor 1000 in a certain direction or controls the operating characteristics of the image sensor 1000 (e.g., adjusting of a read-out timing) in order to compensate for a negative influence of the motion. The image stabilizer CM40 may sense the movement of the camera module ED80 or the electronic apparatus ED01 by using a gyro sensor (not shown) or an acceleration sensor (not shown) arranged in or out of the camera module ED80. The image stabilizer CM40 may be implemented as an optical type.

The memory CM50 may store some or entire data of the image obtained through the image sensor 1000 for next image processing operation. For example, when a plurality of images are obtained at a high speed, obtained original data (e.g., Bayer-patterned data, and/or high resolution data) is stored in the memory CM50, and a low resolution image is only displayed. Then, original data of a selected image (e.g., user selection) may be transferred to the image signal processor CM60. The memory CM50 may be integrated with the memory ED30 of the electronic apparatus ED01, or may include an additional memory that is operated independently.

The image signal processor CM60 may perform image treatment on the image obtained through the image sensor CM30 or the image data stored in the memory CM50. As described above with reference to FIGS. 1 to 15, the first image (e.g., RGB image), the second image (e.g., MSI image) acquired by two image sensors included in the image sensor CM30 are processed to generate a third image in which the white balance has been performed. The configuration of the processor 500 for performing the above color calibration may be included in the image signal processor CM60.

The image treatments may include a depth map generation, a three-dimensional modeling, a panorama generation, extraction of features, an image combination, and/or an image compensation (e.g., noise reduction, resolution adjustment, brightness adjustment, blurring, sharpening, and/or softening). The image signal processor CM60 may perform controlling (e.g., exposure time control, and/or read-out timing control) of the elements (e.g., image sensor CM30) included in the camera module ED80. The image processed by the image signal processor CM60 may be stored again in the memory CM50 for additional process, or may be provided to an external element of the camera module ED80 (e.g., the memory ED30, the display device ED60, the electronic apparatus ED02, the electronic apparatus ED04, and/or the server ED08). The image signal processor CM60 may be integrated with the processor ED20, or may be configured as an additional processor that is independently operated from the processor ED20. When the image signal processor CM60 is configured as an additional processor separately from the processor ED20, the image processed by the image signal processor CM60 undergoes through an additional image treatment by the processor ED20 and then may be displayed on the display device ED60.

The electronic apparatus ED01 may include a plurality of camera modules ED80 having different properties or functions. In this case, one of the plurality of camera modules ED80 may include a wide-angle camera and another camera module ED80 may include a telephoto camera. Similarly, one of the plurality of camera modules ED80 may include a front camera and another camera module ED80 may include a rear camera.

FIGS. 18 to 27 are diagrams showing various examples of an electronic device to which an image acquisition apparatus according to one or more embodiments is applied.

Figure 18:
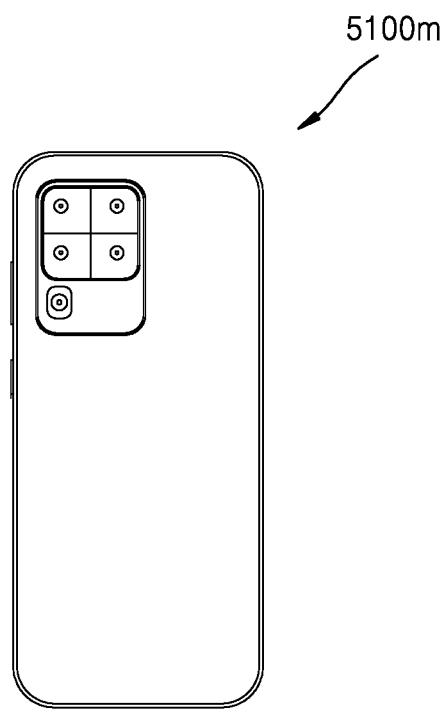
FIGS. 18 to 27 are diagrams showing various examples of an electronic device to which an image acquisition apparatus according to one or more embodiments is applied.
Figure 19:
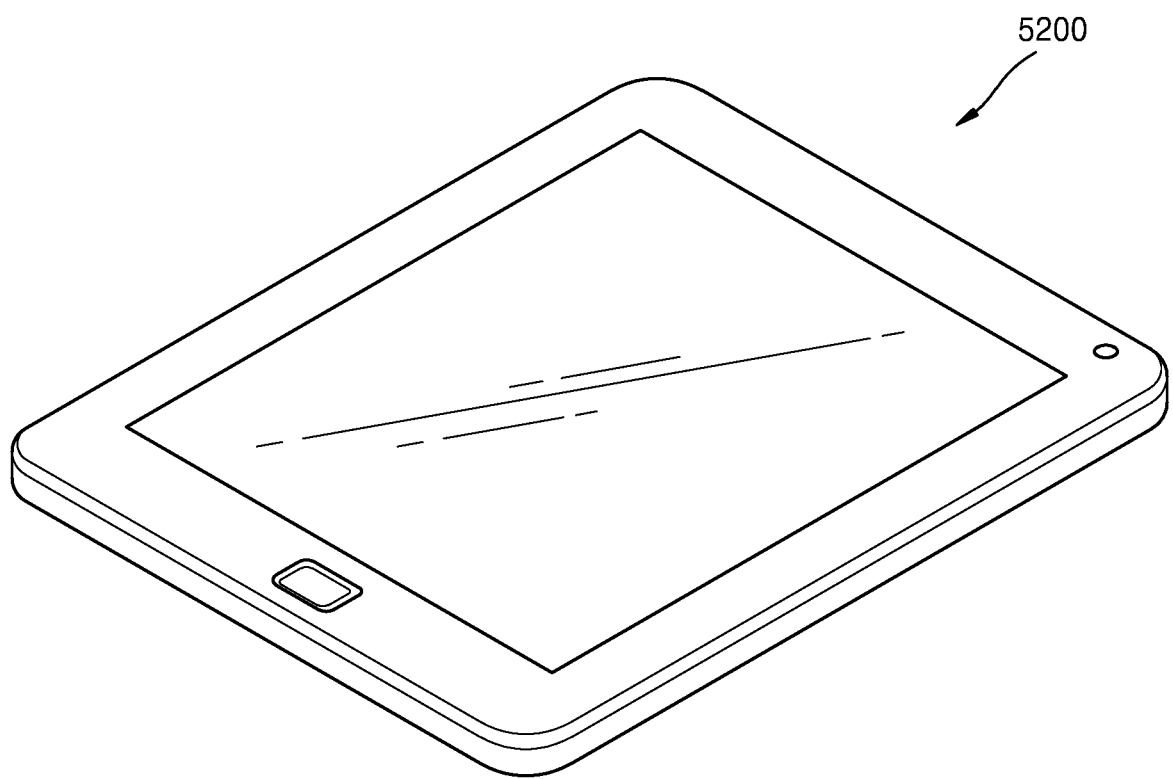
Figure 20:
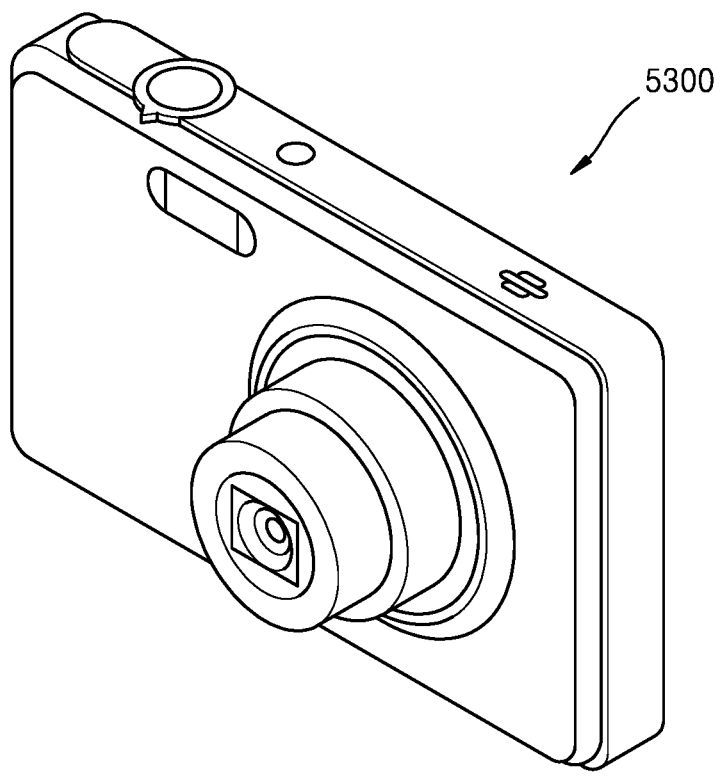
Figure 21:
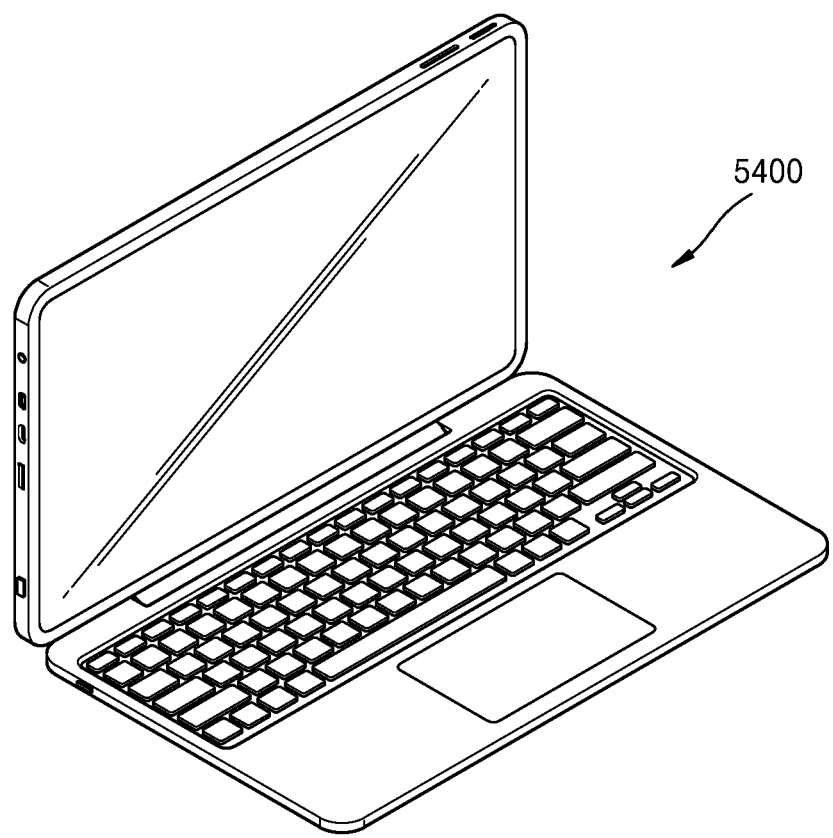
Figure 22:
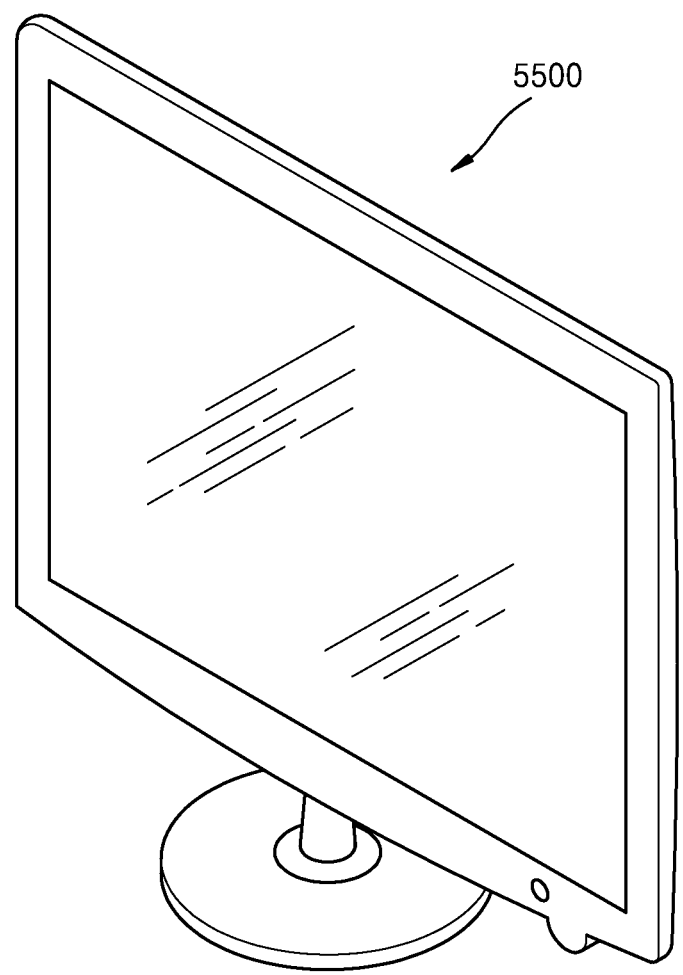

The image capturing apparatus may be applied to a mobile phone or a smartphone 5100m shown in FIG. 18, a tablet or a smart tablet 5200 shown in FIG. 19, a digital camera or a camcorder 5300 shown in FIG. 20, a laptop computer 5400 shown in FIG. 21, or a television or a smart television 5500 shown in FIG. 22. For example, the smartphone 5100m or the smart tablet 5200 may include a plurality of high-resolution cameras each including a high-resolution image sensor. Depth information of objects in an image may be extracted, out focusing of the image may be adjusted, or objects in the image may be automatically identified by using the high-resolution cameras.

Figure 23:
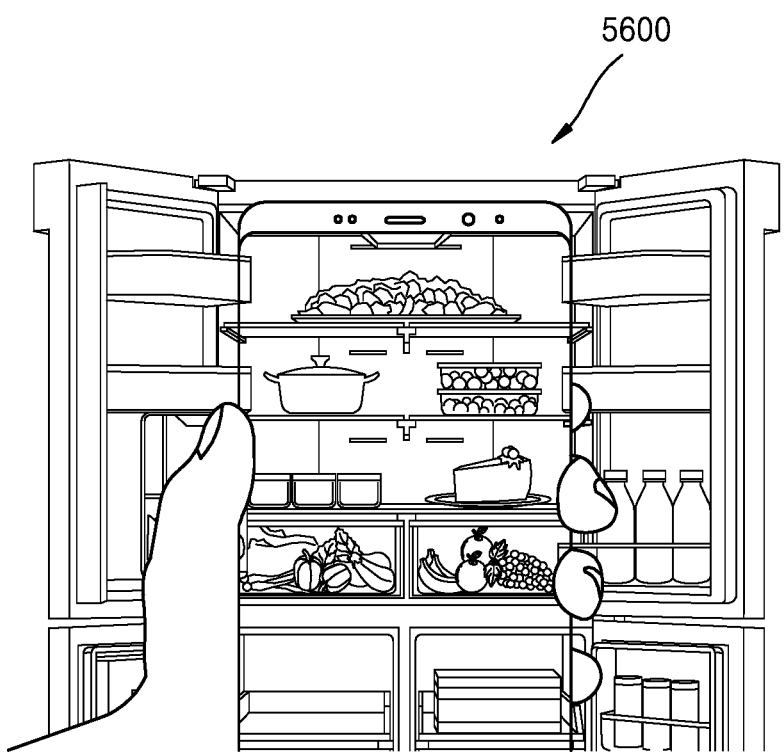
Figure 24:
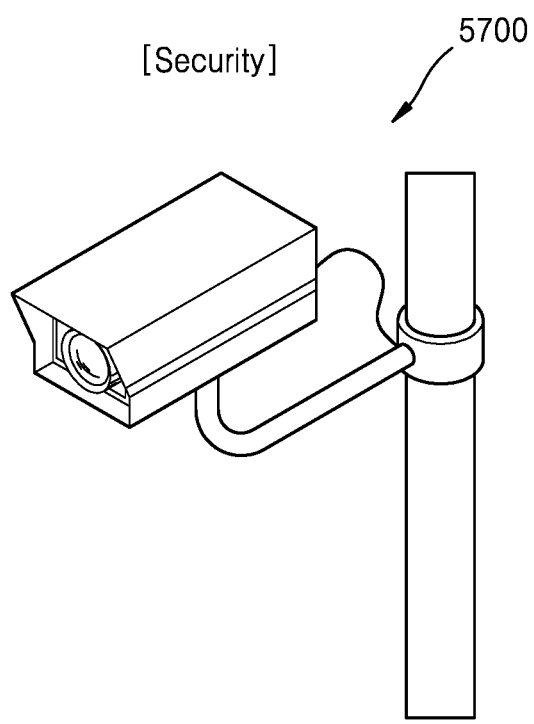
Figure 25:
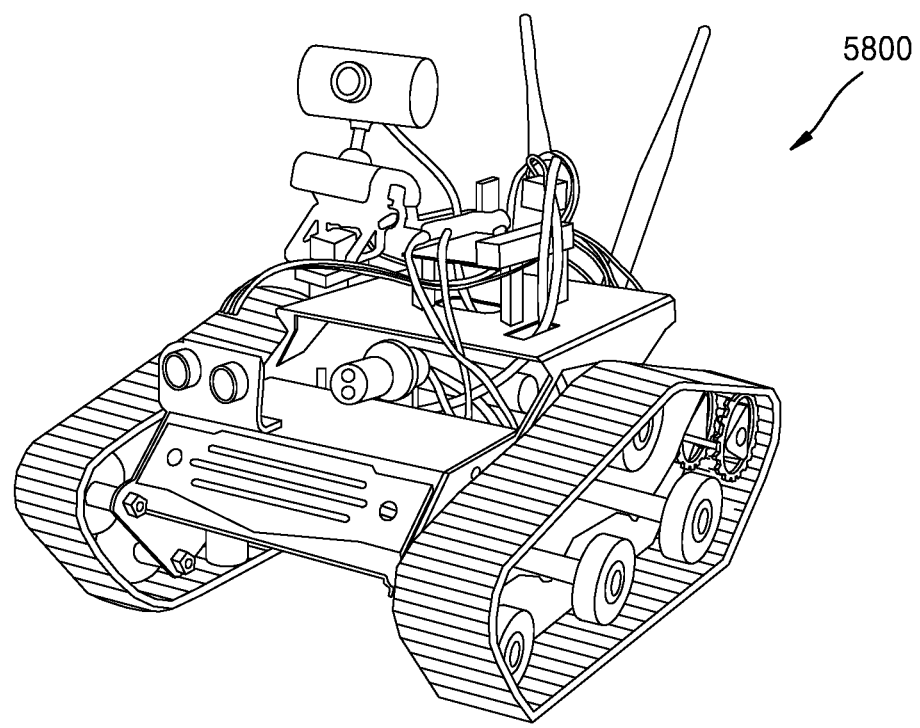
Figure 26:
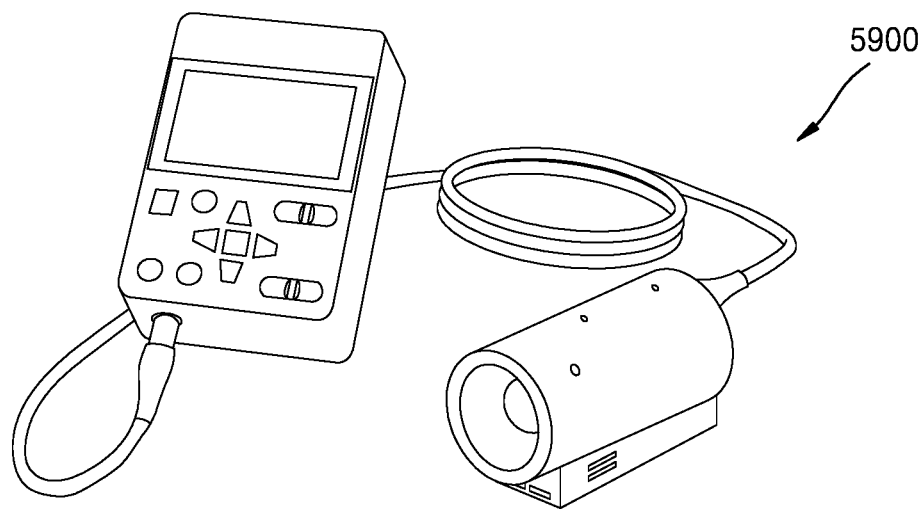

Also, the image capturing apparatus 1000 may be applied to, for example, a smart refrigerator 5600 shown in FIG. 23, a surveillance camera 5700 shown in FIG. 24, a robot 5800 shown in FIG. 25, a medical camera 5900 shown in FIG. 26. For example, the smart refrigerator 5600 may automatically recognize food in the refrigerator by using the image capturing apparatus 1000, and may notify the user of an existence of a certain kind of food, kinds of food put into or taken out through a smartphone. Also, the surveillance camera 5700 may provide an ultra-high-resolution image and may allow the user to recognize an object or a person in the image even in dark environment by using high sensitivity. The robot 5800 may be input to a disaster or industrial site that a person may not directly access, to provide the user with high-resolution images. The medical camera 5900 may provide high-resolution images for diagnosis or surgery, and may dynamically adjust a field of view.

Figure 27:
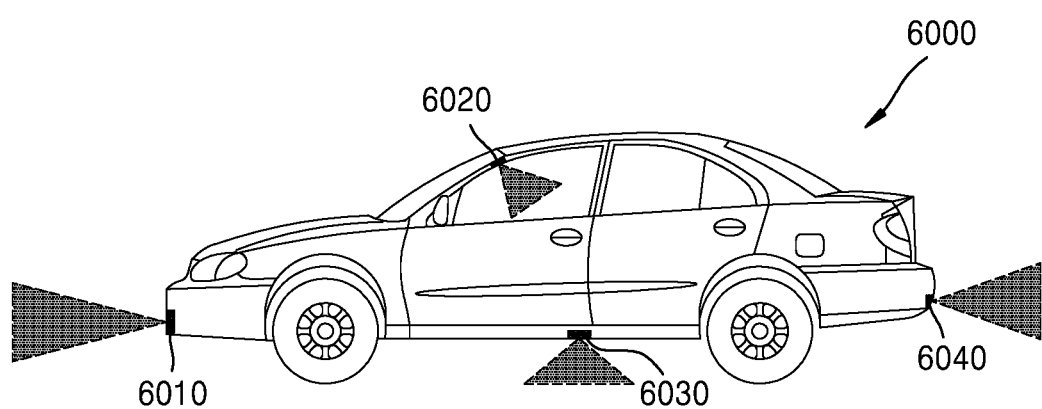

Also, the image capturing apparatus 1000 may be applied to a vehicle 6000 as shown in FIG. 27. The vehicle 6000 may include a plurality of vehicle cameras 6010, 6020, 6030, and 6040 at various locations. Each of the vehicle cameras 6010, 6020, 6030, and 6040 may include the image capturing apparatus. The vehicle 6000 may provide a driver with various information about the interior of the vehicle 6000 or the periphery of the vehicle 6000 by using the plurality of vehicle cameras 6010, 6020, 6030, and 6040, and may provide the driver with the information necessary for the autonomous travel by automatically recognizing an object or a person in the image.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An image acquisition apparatus comprising:
   a sensor unit comprising a plurality of first image sensors that are based on a wavelength band of 380 nm to 780 nm; and
   at least one processor configured to:
      acquire common illumination information from an image output from at least one of the plurality of first image sensors, and
      color-convert an image output from each of the plurality of first image sensors based on the common illumination information,
   wherein the at least one processor, when acquiring the common illumination information, is configured to:
      acquire individual illumination information with respect to each image output from the plurality of first image sensors;
      overlay the individual illumination information based on a positional relationship between pixels in the individual illumination information; and
      acquire the common illumination information from the overlaid individual illumination information.

2. The image acquisition apparatus of claim 1, wherein in the plurality of first image sensors, at least one of focal length or field of view (FOV) are different from each other.

3. The image acquisition apparatus of claim 2, wherein the at least one processor being configured to overlay the individual illumination information includes being configured to over lay the individual illumination information in an order in which the focal length of the plurality of first image sensors increase or in an order in which the FOV of the plurality of first image sensors decrease.

4. The image acquisition apparatus of claim 1, wherein the at least one processor being configured to acquire the common illumination information includes being configure to input the image output from each of the plurality of first image sensors into a deep-learning network that is trained in advance.

5. The image acquisition apparatus of claim 1, wherein the at least one processor being configured to acquire the common illumination information includes being configured to acquire the common illumination information from one of the images output from the plurality of first image sensors, the plurality of first image sensors having different focal lengths and fields of view (FOVs) from each other.

6. The image acquisition apparatus of claim 5, wherein the sensor unit is configured to, when a focal length of a reference image sensor from which the common illumination information is acquired is greater than a focal length of a target image sensor in which color conversion is to be performed, estimate the common illumination information with respect to the target image sensor through an extrapolation.

7. The image acquisition apparatus of claim 5, wherein the sensor unit is configured to, when an FOV of a reference image sensor from which the common illumination information is acquired is less than an FOV of a target image sensor in which color conversion is to be performed, estimate the common illumination information with respect to the target image sensor through an extrapolation.

8. The image acquisition apparatus of claim 1,
   wherein the sensor unit further comprises a second image sensor configured to divide a light spectrum into more wavelength bands than the plurality of first image sensors, and
   wherein the at least one processor is further configured to acquire the common illumination information from an image output from the second image sensor.

9. The image acquisition apparatus of claim 8, wherein the second image sensor comprises a multispectral image sensor configured to acquire images of at least four channels based on a wavelength band of 10 nm to 1000 nm.

10. The image acquisition apparatus of claim 9, wherein the at least one processor is further configured to acquire the common illumination information based on at least one of the at least four channels acquired from the multispectral image sensor.

11. The image acquisition apparatus of claim 1, wherein the common illumination information includes at least one of a color temperature of an illumination, an illumination vector corresponding to an intensity of an illumination spectrum, an XYZ vector indicating a color of illumination, an RGB vector indicating a color of illumination, or an index value indicating illumination information stored in advance, with respect to an image on which color conversion is to be performed.

12. The image acquisition apparatus of claim 1, wherein the at least one processor is further configured to:
   divide a reference image from which the common illumination information is acquired into a plurality of regions, and
   acquire illumination information for each of the plurality of regions from at least one of the plurality of regions.

13. The image acquisition apparatus of claim 12, wherein the at least one processor being configured to acquire the common illumination information includes being configured to acquire the common illumination information by interpolating the illumination information for each of the plurality of regions obtained from the divided reference image.

14. The image acquisition apparatus of claim 1, wherein the at least one processor being configured to acquire the common illumination information includes being configured to acquire the common illumination information based on a basis vector, a spatial position, and a channel index of a reference image from which the common illumination information is acquired.

15. The image acquisition apparatus of claim 1, wherein the at least one processor is further configured to register a first image output from a reference image sensor and a second image output from a target image sensor, based on at least one of positional information, a resolution, an optical axis, an FOV, or a focal length of each of the reference image sensor from which the common illumination information is acquired and the target image sensor on which color conversion is to be performed.

16. The image acquisition apparatus of claim 15, wherein the at least one processor being configured to register the first image and the second image includes being configured to register the first image and the second image based on edges and features of the first image and the second image.

17. The image acquisition apparatus of claim 16, wherein the at least one processor is further configured to perform a white balance on the second image based on the common illumination information of the first image.

18. The image acquisition apparatus of claim 1, wherein the at least one processor is further configured to perform a gamma correction or a color correction on the color-converted image.

19. An image acquisition method comprising:
   acquiring images from a plurality of first image sensors that are based on a wavelength band of 380 nm to 780 nm;
   acquiring common illumination information from an image output from at least one of the plurality of first image sensors; and
   color-converting the image output from each of the plurality of first image sensors based on the common illumination information,
   wherein the acquiring common illumination information comprises:
      acquiring individual illumination information with respect to each image output from the plurality of first image sensors;
      overlaying the individual illumination information based on a positional relationship between pixels in the individual illumination information; and
      acquiring the common illumination information from the overlaid individual illumination information.

* * * * *